United States Patent
Mashiki et al.

(10) Patent No.: US 6,352,491 B2
(45) Date of Patent: Mar. 5, 2002

(54) FUEL SUPPLY AMOUNT CONTROL APPARATUS AND METHOD FOR INTERNAL COMBUSTION ENGINE

(75) Inventors: Zenichiro Mashiki, Nisshin; Isao Takagi, Okazaki; Hirofumi Kubota, Mishima; Hiroya Tanaka, Nishikamo-gun; Shinichi Mitani, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/860,482

(22) Filed: May 21, 2001

(30) Foreign Application Priority Data

May 23, 2000 (JP) ............................. 12-151603

(51) Int. Cl.⁷ ............................. B60K 41/02
(52) U.S. Cl. .................. 477/107; 477/109; 477/181; 123/295
(58) Field of Search ............... 477/107, 109, 477/181; 123/295

(56) References Cited

U.S. PATENT DOCUMENTS 5,468,196 A * 11/1995 Minowa et al. ............. 477/107
5,772,555 A * 6/1998 Minowa et al. ............. 477/109
6,017,290 A * 1/2000 Kinoshita et al. ........... 477/107
6,169,949 B1 * 1/2001 Sato ........................... 477/107

FOREIGN PATENT DOCUMENTS

JP    A 10-169490    6/1998

* cited by examiner

Primary Examiner—Erick Solis
(74) Attorney, Agent, or Firm—Oliff & Berridge PLC

(57) ABSTRACT

A fuel supply amount control apparatus for an internal combustion engine uses an idling control amount QISC obtained by reducing an idling control amount Qa by an idling control amount correction value KQISC, when determining the amount of fuel injected for the lean combustion when the vehicle is running. Therefore, during the lean combustion with the D range is selected, there is substantially no difference between the road load amount of fuel injected during the idling state and the road load amount of fuel injected during a low-speed running of the vehicle. Hence, an increase in the amount of fuel injection during the low-speed running of the vehicle based on the lean combustion achieved upon a fuel increase request does not result in an excessively great output torque of the engine, so that the low-speed running of the vehicle becomes stable and good drivability can be maintained.

21 Claims, 19 Drawing Sheets

FUEL SUPPLY AMOUNT CONTROL APPARATUS AND METHOD FOR INTERNAL COMBUSTION ENGINE

INCORPORATION BY REFERENCE

The disclosure of Japanese Patent Application No. 2000-151603 filed on May 23, 2000, including the specification, drawings and abstract is incorporated herein by reference in its entirety.

BACKGROUND OF THE INVENTION

1. Field of Invention

The present invention relates to a fuel supply amount control apparatus and method for a spark ignition type internal combustion engine that is installed as a vehicle-driving engine and that allows a lean combustion based on an air-fuel mixture that has a lower proportion of fuel than a stoichiometric air-fuel ratio mixture, wherein an idling control amount for maintaining a target idle revolution speed during idling is calculated, and wherein if the lean combustion is performed during idling, the amount of fuel supplied is adjusted based on the idling control amount.

2. Description of Related Art

Direct injection internal combustion engines and lean-burn internal combustion engines which improve fuel economy by reducing the pump loss and the heat loss of the spark ignition type internal combustion engines and thereby increasing the theoretical heat efficiency are known. The direct injection type engines, in particular, allow combustion of a very lean mixture by conducting a stratified charge combustion in which an amount of fuel whose proportion to the amount of intake air is less than the fuel-to-intake air proportion represented by a stoichiometric air-fuel ratio is stratified and is ignited. Therefore, even during a low-load and low-speed state of the engine, for example, during an idling state, a large amount of air can be taken in by opening a throttle valve to a great degree, so that the pump loss and the thermal loss can be sufficiently reduced.

Similarly, the lean-burn engines conduct a homogeneous lean combustion in which intake air is homogeneously mixed with an amount of fuel whose proportion to the amount of intake air is less than the fuel-to-intake air proportion represented by a stoichiometric air-fuel ratio and such a homogeneous mixture is ignited. In this case, too, during a low-load and low-speed state of the engine, for example, during idling, a large amount of air can be taken in by opening a throttle valve to a great degree, so that the pump loss and the thermal loss can be reduced.

The aforementioned engine of either one of the direct injection type and the lean-burn type calculates an idling control amount for maintaining the engine revolution speed at a target idle revolution speed through a feedback control of bringing the engine revolution speed to the target idle revolution speed during the idling state. During the idling of the vehicle, the engine performs a fuel injection amount control taking the idling control amount into account, so as to increase the amount of fuel injection in accordance with a request (see, for example, Japanese Patent Application Laid-Open No. 10-169490).

Although the direct injection type engine and the lean-burn type engines are able to reduce the pump loss and the heat loss as described above, it becomes impossible to achieve a sufficient level of generally-termed intake negative pressure, that is, negative pressure in the engine intake passage, when the throttle valve is opened to a great degree during the idling state.

When the intake negative pressure becomes insufficient during the idling state as mentioned above, a problem arises, for example, in a case where intake negative pressure is utilized for a brake booster. In such a case, sufficient amplification of brake pedal-depressing force may become impossible during the idling state. Furthermore, if the amount of intake air is excessively large, the burning rate may be excessively increased, thereby causing a problem of great combustion noises during the idling state, and the like. Therefore, during the idling state, the degree of opening of the throttle valve is kept at a relatively reduced degree to produce a necessary intake negative pressure.

If the running of the vehicle is started from the idling state in which a necessary intake negative pressure is produced as mentioned above, there is no need to reduce the degree of opening of the throttle valve particularly for the sake of the brake booster, reduction of combustion noises, etc. Furthermore, at the time of start of the vehicle, the vehicle running speed is low, and therefore, the vehicle running resistance is small, that is, there is substantially no difference from the idling state where the vehicle running resistance is "0".

Therefore, when the low-speed running of the vehicle is started, the amount of fuel needed to run the vehicle is not clearly different from the amount of fuel consumed during the idling state. That is, the amount of fuel needed at the start of the low-speed running of the vehicle is substantially the same as the amount fuel consumed during the idling state of the engine.

Hence, in a case where an idling control amount is calculated during the idling state and the fuel injection amount control taking the idling control amount into account is performed at the time of running the vehicle as in the conventional art, there is a danger that an increase in the amount of fuel injection achieved in accordance with a fuel increase request may result in an excessively great output torque of the engine so that the stable low-speed running of the vehicle may become difficult.

SUMMARY OF THE INVENTION

It is one object of the invention to realize the stable low-speed running of a vehicle equipped with a spark ignition type internal combustion engine that conducts a lean combustion, such as a stratified charge combustion or the like.

In accordance with a first aspect of the invention, a fuel supply amount control apparatus for a spark ignition type internal combustion engine is installed in a vehicle as a vehicle-driving engine and allows a lean combustion of a mixture in which a proportion of fuel is less than in a mixture of a stoichiometric air-fuel ratio. The fuel supply amount control apparatus calculates an idling control amount for keeping a revolution speed of the internal combustion engine at a target idle revolution speed during an idling state of the engine, and adjusts an amount of fuel supplied based on the idling control amount if the lean combustion is conducted during the idling state. The control apparatus also reflects (uses) a control amount obtained by reducing the idling control amount when determining the amount of fuel supplied for the lean combustion during a run of the vehicle.

The control apparatus reflects the control amount obtained through the reducing correction of the idling control amount when determining the amount of fuel supplied for the lean combustion when the vehicle is running. Thus, instead of reflecting the idling control amount for keeping the revolution speed of the engine at the target idle revolution speed immediately in the amount of fuel supplied for the lean combustion during the running of the vehicle, the control apparatus reflects a control amount obtained after the reducing correction of the idling control amount in the aforementioned amount of fuel supplied.

Therefore, during the lean combustion at the time of start of the running of the vehicle, an increase in the amount of fuel injection achieved in accordance with a fuel increase request does not cause an excessive output torque of the engine while the vehicle speed is low, so that the low-speed running of the vehicle becomes stable and good drivability can be maintained.

Furthermore, unnecessary fuel injection is avoided, so that fuel economy improves.

In the above-described aspect of the invention, the control apparatus may reflect the control amount obtained through the reducing correction of the idling control amount performed in accordance with the running speed of the vehicle, in the amount of fuel supplied for the lean combustion during the running of the vehicle.

The vehicle running resistance changes in accordance with the vehicle running speed. Therefore, if the control amount obtained by correcting the idling control amount in the reducing direction in accordance with the vehicle running speed is reflected in the amount of fuel supplied for the lean combustion during the running of the vehicle, an appropriate amount of fuel can be supplied corresponding to the running resistance of the vehicle. Hence, the controllability of the output torque of the engine improves, so that the low-speed running of the vehicle becomes more stable, and better drivability can be maintained.

In the above-described aspect of the invention, the control apparatus may reflect the control amount obtained through the reducing correction of the idling control amount performed in accordance with the revolution speed of the engine, in the amount of fuel supplied for the lean combustion during the running of the vehicle.

The engine efficiency changes in accordance with the engine revolution speed. Therefore, if the control amount obtained by correcting the idling control amount in the reducing direction in accordance with the revolution speed of the engine is reflected in the amount of fuel supplied for the lean combustion during the running of the vehicle, an appropriate amount of fuel can be supplied corresponding to the efficiency of the engine. Hence, the controllability of the output torque of the engine improves, so that the low-speed running of the vehicle becomes more stable, and better drivability can be maintained.

In the above-described aspect of the invention, the fuel supply amount control apparatus may further include a transmission mechanism having a fluidic power transfer mechanism that transfers a drive power between an input shaft and an output shaft via a fluid and that assumes a locked-up state in which the input shaft and the output shaft are interlocked when necessary. When the fluidic power transfer mechanism is in the locked-up state, the control apparatus reflects the control amount obtained through the reducing correction of the idling control amount in the amount of fuel supplied for the lean combustion during the run of the vehicle. When the fluidic power transfer mechanism is in an unlocked state, the control apparatus reflects a control amount set without the reducing correction of the idling control amount or a control amount obtained through a reducing correction of the idling control amount that is performed to a lesser extent than the reducing correction performed during the locked-up state, in the amount of fuel supplied for the lean combustion during the run of the vehicle.

In a vehicle equipped with the transmission mechanism that includes the fluidic power transfer mechanism that selectively assumes the locked-up state, the efficiency in transferring the output torque of the engine is low when the fluidic power transfer mechanism is in the unlocked state. Therefore, during the unlocked state, excessively great output torque of the engine, if any occurs, has only a reduced effect on the state of running of the vehicle. When the fluidic power transfer mechanism is locked up, the engine output torque transfer efficiency improves, so that problems caused by excessively great output torque of the engine become remarkable.

Therefore, when the vehicle is running with the fluidic power transfer mechanism unlocked, the stable low-speed running of the vehicle is maintained even if an excessive amount of fuel is supplied to the engine during the lean combustion mode. Furthermore, due to the fuel increase effect, revolution of the engine is stabilized, and the antiengine stall characteristic during the low-speed running of the vehicle can be improved. When the vehicle is running with the locked-up state, the vehicle running speed is relatively high, so that a good anti-engine stall characteristic can be maintained even if the amount of fuel supplied is reduced. Furthermore, since the controllability of the output torque of the engine improves, the stable state of the low-speed running of the vehicle continues, and good drivability is maintained.

In the above-described aspect of the invention, the lean combustion may be a stratified charge combustion in which a high-fuel concentration layer is formed by using an amount of fuel whose proportion to an amount of intake air is less than a fuel-to-intake air proportion represented by a stoichiometric air-fuel ratio and the high-fuel concentration layer is ignited.

One example of the lean combustion is the stratified charge combustion in which an amount of fuel whose proportion to the amount of intake air is less than the fuel-to-intake air proportion represented by a stoichiometric air-fuel ratio is stratified with a high fuel concentration and is ignited. During the stratified charge combustion, there is substantially no difference between the amount of fuel supply needed during the idling state and the amount of fuel supply needed during the low-speed running of the vehicle, so that the aforementioned advantages are remarkable.

In the above-described aspect of the invention, the lean combustion may be a homogeneous lean combustion in which a mixture is formed by mixing an amount of intake air with an amount of fuel whose proportion to the amount of intake air is less than a fuel-to-intake air proportion represented by a stoichiometric air-fuel ratio and the mixture is ignited.

Another example of the lean combustion is the homogeneous lean combustion in which a mixture is formed by homogeneously mixing an amount of intake air with an amount of fuel whose proportion to the amount of intake air is less than the fuel-to-intake air proportion represented by a stoichiometric air-fuel ratio and is ignited. During the homogeneous lean combustion, there is substantially no difference between the amount of fuel supply needed during the idling state and the amount of fuel supply needed during the low-speed running of the vehicle, so that the aforementioned advantages are remarkable.

BRIEF DESCRIPTION OF THE DRAWINGS

The foregoing and further objects, features and advantages of the invention will become apparent from the following description of preferred embodiments with reference to the accompanying drawings, in which like numerals are used to represent like elements and wherein.

DETAILED DESCRIPTION OF PREFERRED EMBODIMENTS

Figure 1:
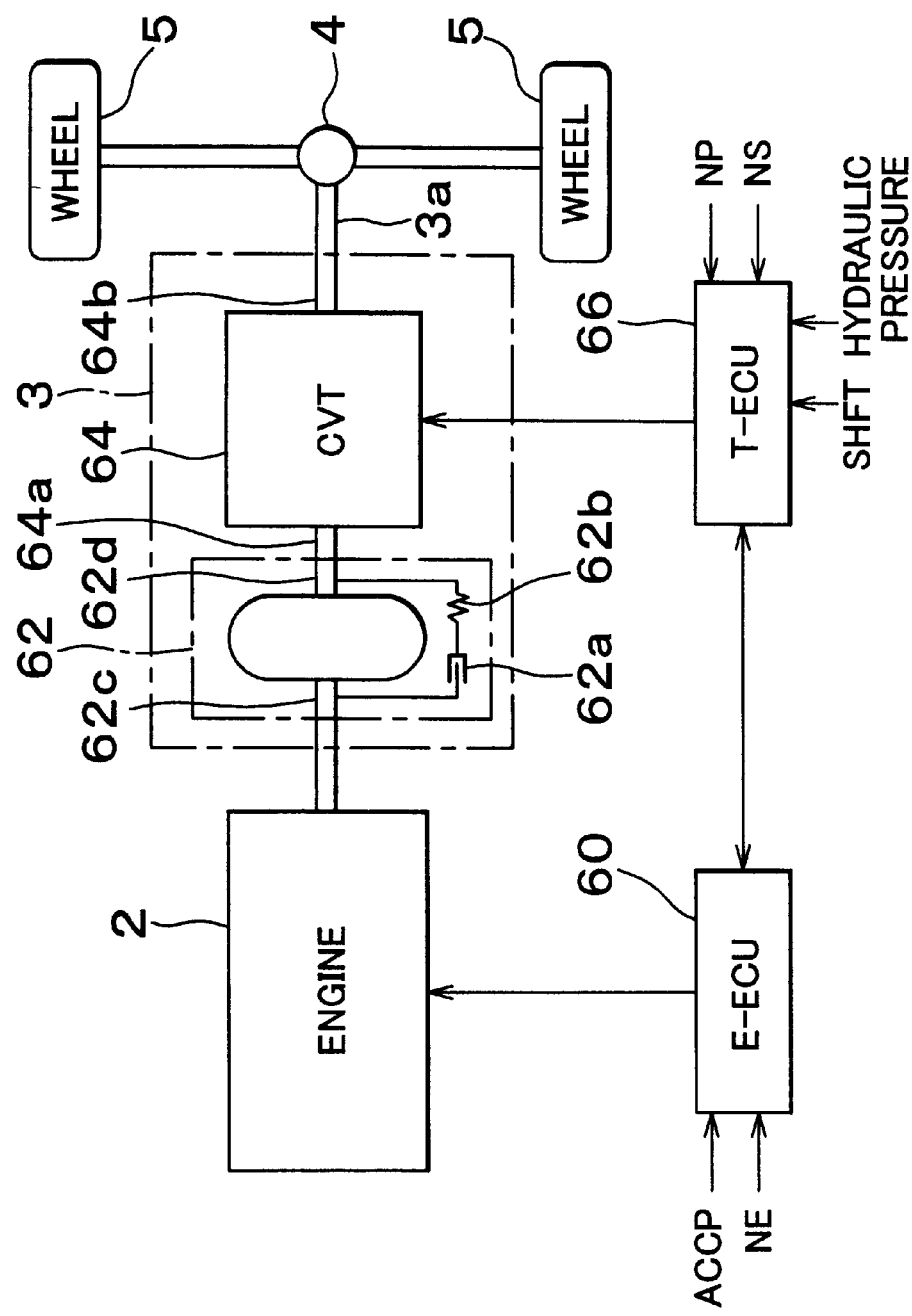
FIG. 1 is a schematic block diagram of a drive system and a control system of a motor vehicle in accordance with a first embodiment of the invention.

FIG. 1 is a schematic block diagram of a drive system and a control system for a motor vehicle to which the invention is applied.

An engine 2 as a power source is connected to a transmission mechanism 3. An output shaft 3a of the transmission mechanism 3 is connected to right and left-side drive wheels 5 via a differential 4.

Figure 2:
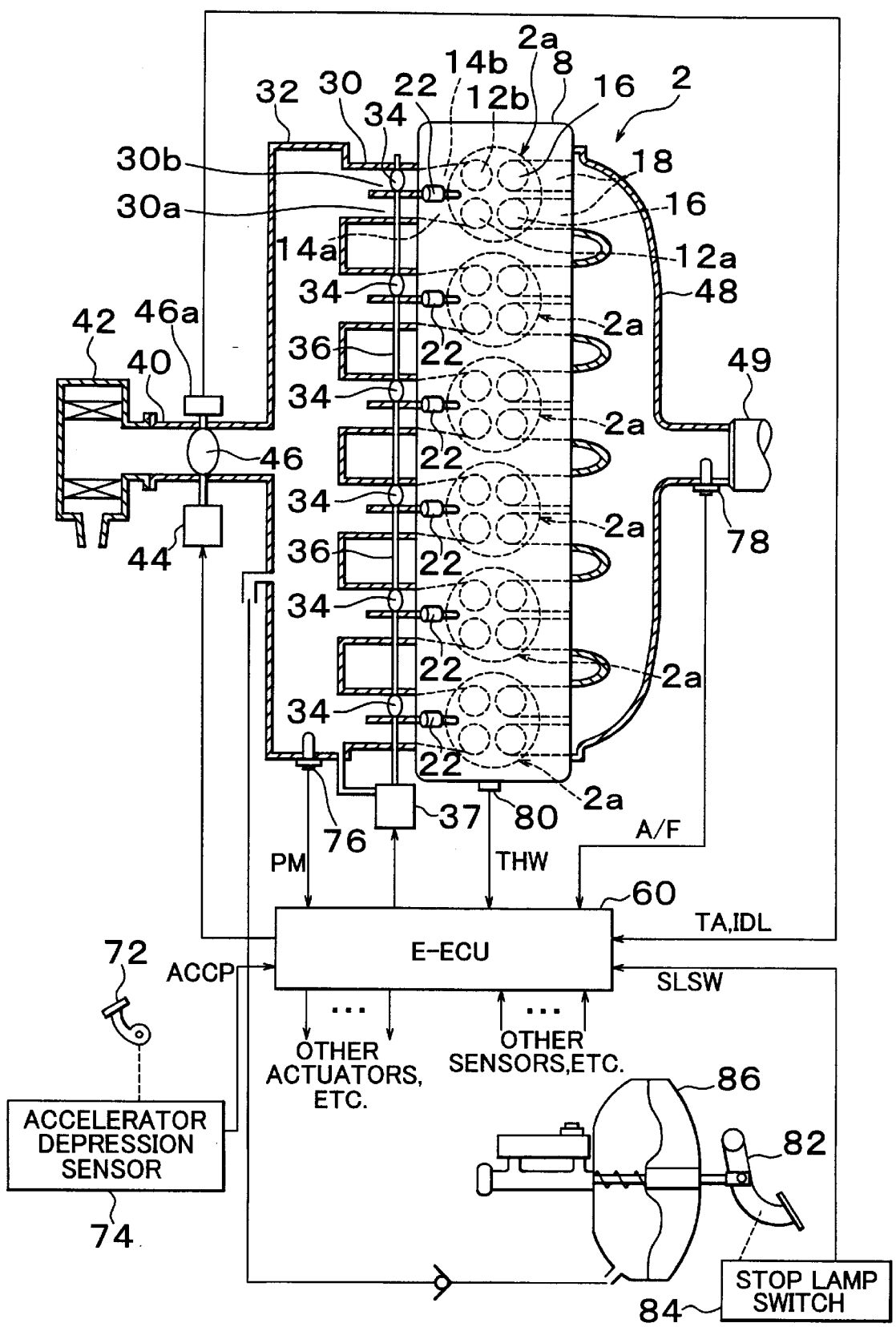
FIG. 2 is a schematic diagram illustrating a construction of an engine in accordance with the first embodiment.

FIG. 2 schematically shows a construction of the engine 2. The engine 2 is a direct injection type gasoline engine that is installed as a vehicle-driving engine in a motor vehicle. The engine 2 has six cylinders 2a. As shown in FIGS. 3 to 6, each cylinder 2a has a combustion chamber 10 that is defined by a cylinder block 6, a piston 7 disposed for reciprocating movements within the cylinder block 6, and a cylinder head 8 mounted on the cylinder block 6.

Each combustion chamber 10 is provided with a first intake valve 12a, a second intake valve 12b, and a pair of exhaust valves 16. Of these valves, the first intake valve 12a is connected to a first intake port 14a. The second intake valve 12b is connected to a second intake port 14b. The two exhaust valves 16 are connected to two exhaust ports 18, respectively.

Figure 3:
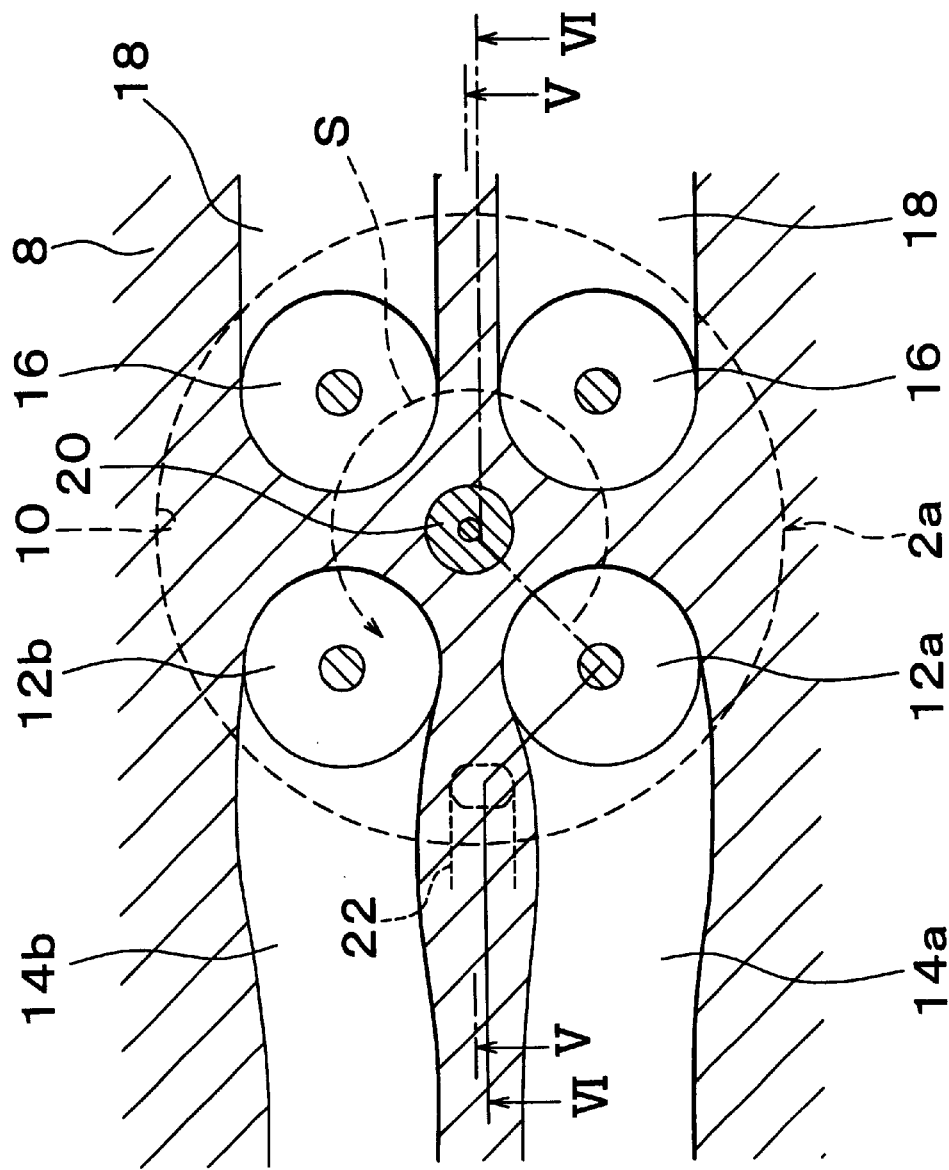
FIG. 3 is a horizontal sectional view of a cylinder head in the engine in the first embodiment.

FIG. 3 is a horizontal sectional view of a portion of the cylinder head 8 corresponding to one of the cylinders. As shown in FIG. 3, the first intake port 14a and the second intake port 14b of each cylinder are straight intake ports that extend substantially linearly. An ignition plug 20 is disposed in a central portion of an inner wall surface of the cylinder head 8. A fuel injection valve 22 is disposed in a peripheral portion of an inner wall surface of the cylinder head 8 that is adjacent to both the first intake valve 12a and the second intake valve 12b. Each fuel injection valve 22 is disposed so that fuel can be injected therefrom directly into the combustion chamber 10.

Figure 4:
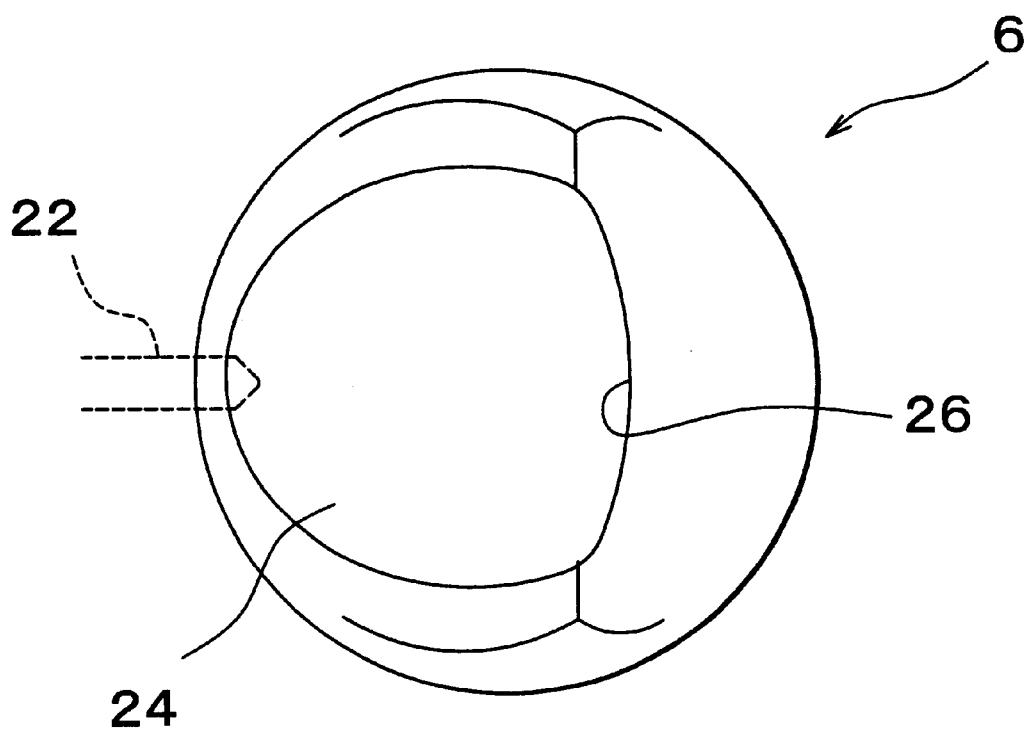
FIG. 4 is a plan view of a top surface of a piston in the engine in the first embodiment.
Figure 5:
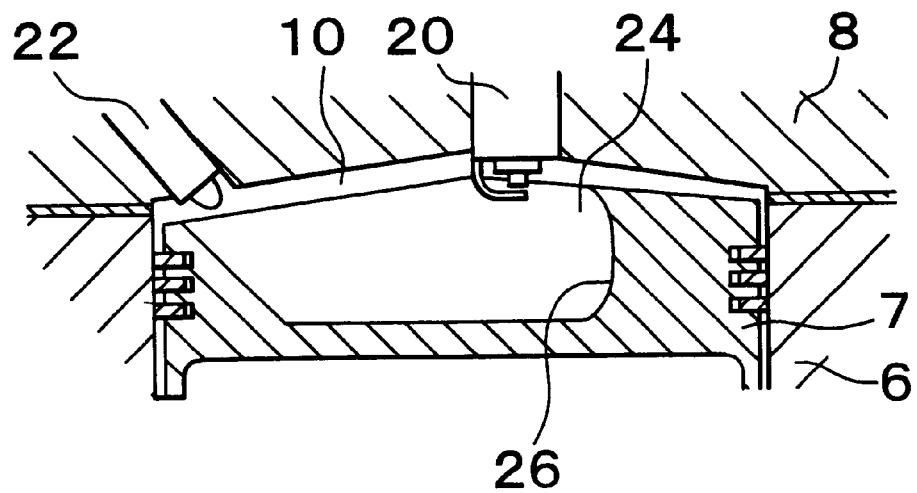
FIG. 5 is a section taken on line V—V in FIG. 3.
Figure 6:
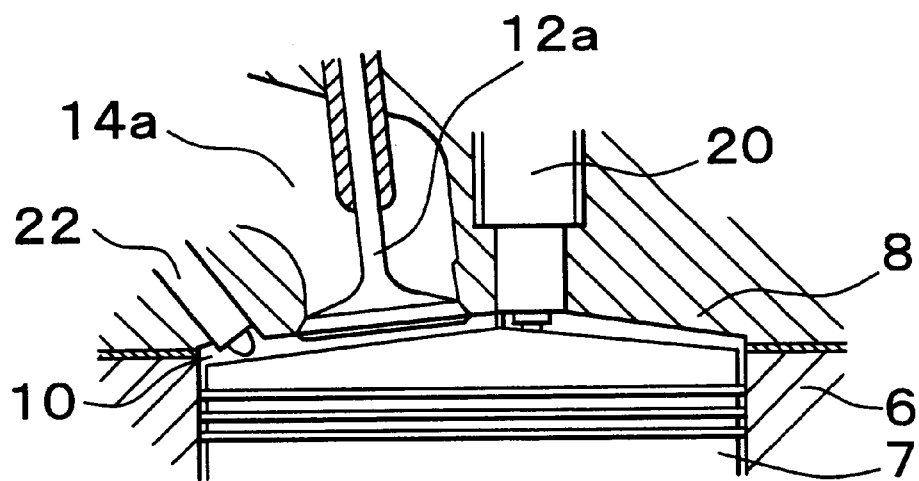
FIG. 6 is a section taken on line VI—VI in FIG. 3.

FIG. 4 is a plan view of a stop surface of one of the pistons 7. FIG. 5 is a section taken on line V—V in FIG. 3. FIG. 6 is a section taken on line VI—VI in FIG. 3. As shown in the drawings, a generally ridge-shaped top face of the piston 7 has a recess 24 having an inverted dome-like contour which extends from a site below the fuel injection valve 22 to a site below the ignition plug 20.

As shown in FIG. 2, the first intake ports 14a of the cylinders 2a are connected to a surge tank 32 via first intake passages 30a formed in an intake manifold 30. The second intake ports 14b are connected to the surge tank 32 via second intake passages 30b. An airflow control valve 34 is disposed within each second intake passage 30b. The airflow control valves 34 are interconnected via a common shaft 36, and are opened and closed via the shaft 36 by a negative pressure actuator 37 that utilizes intake negative pressure. When the airflow control valves 34 are closed, intake air is introduced via only the first intake ports 14a, and therefore forms strong swirls S (FIG. 3) within the combustion chambers 10.

The surge tank 32 is connected to an air cleaner 42 via an intake duct 40. A throttle valve 46 driven by an electric motor 44 (a DC motor or a stepping motor) is disposed in the intake duct 40. The degree of opening of the throttle valve 46 (degree of throttle opening TA) and the completely closed state of the throttle valve 46 (complete closure signal IDL) are detected by a throttle opening sensor 46a. The degree of opening of the throttle valve 46 is controlled in accordance with the state of operation. The exhaust ports 18 of the cylinders 2*a* are connected to an exhaust manifold 48. The exhaust manifold 48 discharges exhaust gas, via a catalytic converter 49 that controls the emission.

Referring back to FIG. 1, the above-described engine 2 is electrically controlled by an engine-controlling electronic control unit (hereinafter, referred to as "E-ECU") 60 that is mainly formed by a microcomputer. As described below, the E-ECU 60 receives as inputs, signals and detected values corresponding to the engine revolution speed NE, the accelerator operation amount ACCP, etc., so as to control the engine 2.

The transmission mechanism 3 has a fluidic power transfer mechanism 62 and a continuously variable transmission (hereinafter, referred to as "CVT") 64. The fluidic power transfer mechanism 62 is a mechanism that transfers torque between the side of an input shaft 62*c* and the side of an output shaft 62*d* via a fluid such as an oil or the like. In this embodiment, the fluidic power transfer mechanism 62 is a torque converter. The fluidic power transfer mechanism 62 has a lockup mechanism 62*a*. The lockup mechanism 62*a* is a clutch mechanism that directly interlocks the input shaft 62*c* side and the output shaft 62*d* side via a mechanical means such as a friction plate or the like. The lockup mechanism 62*a* has, for a buffering purpose, a damper 62*b* that is formed by an elastic body such as coil spring or the like.

The input shaft 62*c* of the fluidic power transfer mechanism 62 is connected to a crankshaft of the engine 2. The output shaft 62*d* of the fluidic power transfer mechanism 62 is connected to an input shaft 64*a* of the CVT 64. The CVT 64 is a transmission mechanism capable of steplessly (continuously) varying the ratio between the rotation speed of the input shaft 64*a* and the rotation speed of an output shaft 64*b*, that is, the speed ratio. In this embodiment, the CVT 64 is a belt type continuously variable transmission. The CVT 64 incorporates a gear transmission mechanism for accomplishing a reverse drive function, and may further incorporate a gear transmission mechanism for expanding the width of the speed ratio if necessary.

A control of the changing between engagement (locked-up state) and disengagement (unlocked state) of the lockup mechanism 62*a* of the transmission mechanism 3, and a control of the speed ratio of the CVT 64 are performed by a transmission mechanism-controlling electronic control unit (hereinafter, referred to as "T-ECU") 66 in accordance with the state of running of the vehicle.

The T-ECU 66 is connected to the E-ECU 60 in a data transmission capable manner, and receives as inputs, signals and detected values corresponding to the hydraulic pressure for driving the lockup mechanism 62*a*, the rotation speeds NP, NS of pulleys of the CVT 64, etc., as data for control. The T-ECU 66 also receives as inputs, shift signals for selecting one of states of the CVT 64, that is, a stopped state (parking P), a reverse drive state (reverse R), a neutral state (neutral N), an automatic transmission mode (drive D) that is an automatic forward drive state in which the speed ratio is automatically set in accordance with the state of running of the vehicle, and a manual transmission mode (manual M) that is a manual state in which the transmission state is manually set.

Figure 7:
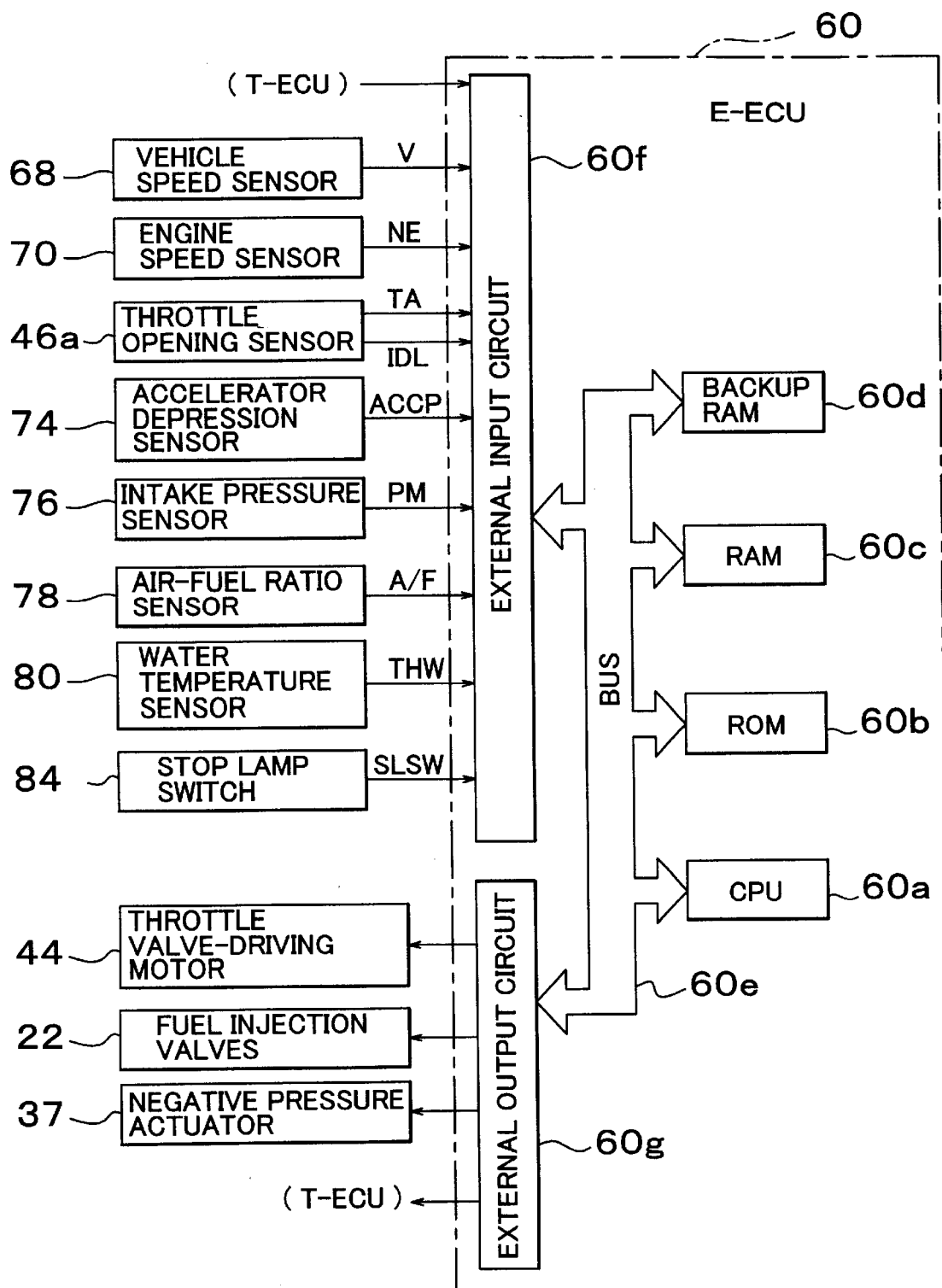
FIG. 7 is a block diagram illustrating a construction of an E-ECU in the first embodiment.

A construction of the E-ECU 60 is illustrated in the block diagram of FIG. 7. The E-ECU 60 is a control unit for controlling the engine 2, for example, performing a throttle opening degree control, a fuel injection amount control, an ignition timing control, an idling speed control, etc. The E-ECU 60 is formed as a logic circuit having a CPU 60*a*, a ROM 60*b*, a RAM 60*c*, a backup RAM 60*d*, etc. The ROM 60*b* is a memory that pre-stores various control programs, data, such as maps or the like, for reference during execution of the various programs. Based on the various programs and data stored in the ROM 60*b*, the CPU 60*a* executes various operations. The RAM 60*c* is a memory for temporarily storing results of operations of the CPU 60*a*, data or the like obtained from outputs of various sensors. The backup RAM 60*d* is a non-volatile memory for storing data that needs to be retained during stoppage of the engine 2. The CPU 60*a*, the ROM 60*b*, the RAM 60*c* and the backup RAM 60*d* are interconnected by a bus 60*e*, and are also connected to an external input circuit 60*f* and an external output circuit 60*g* via the bus 60*e*. The external input circuit 60*f* is connected to a vehicle speed sensor 68 for detecting the running speed of the vehicle (hereinafter, simply referred to as "vehicle speed") V, an engine speed sensor 70 for detecting the engine revolution speed NE, the throttle opening sensor 46*a*, an accelerator depression sensor 74 for detecting the accelerator operation amount ACCP, that is, the amount of depression of an accelerator pedal 72, an intake pressure senor 76 for detecting the intake pressure PM in the surge tank 32, an air-fuel ratio sensor 78 for detecting the air-fuel ratio A/F based on exhaust components, a water temperature sensor 80 for detecting the cooling water temperature THW of the engine 2, a stop lamp switch 84 for detecting whether a brake pedal 82 (FIG. 2) has been depressed, etc. The external output circuit 60*g* is connected to the throttle valve-driving motor 44, the fuel injection valve 22 of each cylinder of the engine 2, the negative pressure actuator 37, an igniter (not shown), and other actuators, which are driven when necessary. As indicated in FIG. 2, the brake pedal 82 is designed so that the depressing force on the brake pedal 82 is amplified by a brake booster 86 that utilizes the negative pressure in the surge tank 32.

Figure 8:
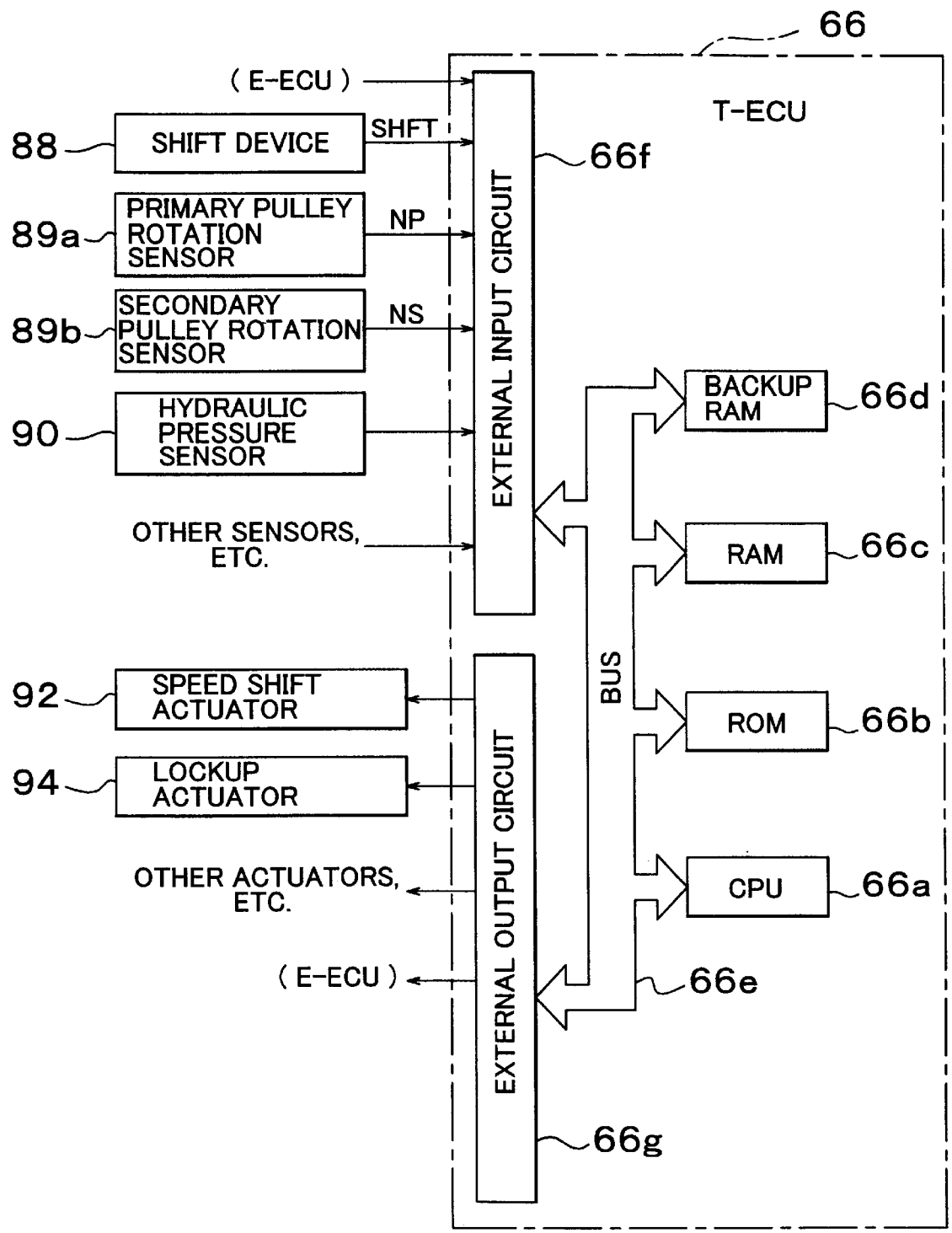
FIG. 8 is a block diagram illustrating a construction of a T-ECU in the first embodiment.

A construction of the T-ECU 66 is shown in the block diagram of FIG. 8. The T-ECU 66 is a control unit that performs an automatic transmission operation by controlling the lockup mechanism 62*a* and the CVT 64. The T-ECU 66 is formed as a logic circuit having a CPU 66*a*, a ROM 66*b*, a RAM 66*c*, a backup RAM 66*d*, a bus 66*e*, an external input circuit 66*f*, an external output circuit 66*g*, etc. These components 66*a* to 66*g* perform basically the same functions as those in the E-ECU 60. The external input circuit 66*f* is connected to a shift device 88 that outputs the aforementioned shift signal SHFT, a primary pulley rotation sensor 89*a* for detecting the rotation speed NP of the primary pulley in the CVT 64, a secondary pulley rotation sensor 89*b* for detecting the rotation speed NS of the secondary pulley in the CVT 64, a hydraulic pressure sensor 90 for detecting the hydraulic pressure for driving the lockup mechanism 62*a*, and other sensors and the like. The external output circuit 66*g* is connected to a speed shift actuator 92 for changing the speed ratio by driving the primary pulley and the second pulley in the CVT 64, a lockup actuator 94 for switching the lockup mechanism 62*a* of the fluidic power transfer mechanism 62, and other actuators and the like. The T-ECU 66 is connected in terms of signals to the E-ECU 60 via the external input circuit 66*f* and the external output circuit 66*g*, for mutual communications with the E-ECU 60.

The E-ECU 60 and the T-ECU 66 constructed as described above perform a coordinate control so as to generate an appropriate drive power on the drive wheels 5 in accordance with a drive power requested by an operating person via the accelerator pedal 72 or the like. More specifically, the E-ECU 60 adjusts one or more of the amount of intake air, the amount of fuel injection, and the form of combustion so as to provide the fuel economy and the engine output torque needed to achieve the requested drive power. The T-ECU 66 adjusts the speed ratio so as to achieve an engine revolution speed NE that is needed to achieve a requested drive power.

With regard to the form of combustion in the first embodiment, one of a stratified charge combustion, a homogeneous combustion and a semi-stratified charge combustion is selected based on the relationship between the requested drive power and the fuel economy. In the stratified charge combustion mode, fuel is injected into each combustion chamber 10 from the corresponding fuel injection valve 22 during a late period in the compression stroke so that a stratified mixture with high fuel concentration is formed, and is ignited. In the homogeneous combustion, fuel is injected into each combustion chamber 10 from the corresponding fuel injection valve 22 during the intake stroke so that a homogeneous mixture is formed, and is then ignited. In the semi-stratified charge combustion, fuel is injected both during the intake stroke and during a late period in the compression stroke so that a stratified mixture is formed in a homogeneous and lean mixture, and is ignited.

During the stratified charge combustion, injected fuel provided in each cylinder by injection performed during the late period of the compression stroke moves from the fuel injection valve 22 into the recess 24 of the piston 7, and then strikes a peripheral wall surface 26 (FIGS. 4, 5). Upon striking the peripheral wall surface 26, fuel moves while vaporizing, and forms a combustible mixture layer in the recess 24 adjacent to the ignition plug 20. The stratified combustible mixture is ignited by the ignition plug 20, thereby accomplishing the stratified charge combustion. In this manner, stable combustion can be accomplished in each combustion chamber 10 with intake air existing in an extremely excess amount relative to fuel.

During the homogeneous combustion, an amount of fuel corrected in various manners based on a stoichiometric air-fuel ratio basic fuel injection amount QBS is injected into each combustion chamber 10 during the intake stroke. The thus-injected fuel flows together into the combustion chamber 10 with inflowing intake air, and continues flowing until ignition. Therefore, a homogeneous mixture of the stoichiometric air-fuel ratio (in some cases, the air-fuel ratio is controlled to a rich air-fuel ratio, which is a higher fuel concentration than the stoichiometric air-fuel ratio, due to an increasing correction) is formed in the entire combustion chamber 10, so that the homogeneous combustion is accomplished.

During the semi-stratified charge combustion, fuel injected in each cylinder by the first injection flows into the combustion chamber 10 together with intake air, thereby forming a homogeneous lean mixture in the entire combustion chamber 10. Then, the second fuel injection is performed at a late time in the compression stroke, so that a combustible mixture layer is formed within the recess 24 in the vicinity of the ignition plug 20 as mentioned above. The stratified combustible mixture is ignited by the ignition plug 20, and the ignited flame burns the lean mixture existing in the entire combustion chamber 10. In this manner, stratified charge combustion with a weak degree of stratification is accomplished, so that a smooth torque change can be realized in an intermediate region between the stratified charge combustion and the homogeneous combustion.

The coordinate control will next be described in detail with reference to the control block diagram of FIG. 9. In the following description, B1 to B7 parenthesized represent blocks shown in FIG. 9. The blocks B3, B4 correspond to processes performed by the T-ECU 66. The other blocks correspond to processes performed by the E-ECU 60.

First, a target drive power F is set based on the accelerator operation amount ACCP and the vehicle speed V (B1). The vehicle speed V may be substituted with, for example, the rotation speed of a different rotating member that has a corresponding relation with the vehicle speed.

The setting of the target drive power F based on the accelerator operation amount ACCP and the vehicle speed V is performed based on a map pre-stored in the ROM 60b. More specifically, a relationship between the vehicle speed V and the target drive power F is pre-set in the form of a map using the accelerator operation amount ACCP as a parameter. This map is used. In the setting of the map, the target drive power F is determined so as to reflect characteristics of the object vehicle or engine 2 or the like.

Next, based on the determined target drive power F and the vehicle speed V or a detected value corresponding to the vehicle speed, a target output P is calculated (B2). More specifically, the target output P can be calculated as a product of the target drive power F and the vehicle speed V as in Expression 1.

$$P \leftarrow F \times V \quad (1)$$

The thus-calculated target output P is used to calculate a target engine revolution speed NEt (B3). More specifically, the engine revolution speed NE that minimizes the fuel consumption with respect to a certain output can be determined separately for each engine 2, and can be prepared as a map. Therefore, in the block B3, a target engine revolution speed NEt is calculated from the target output P, with reference to a one-dimensional map of the target engine revolution speed NEt.

Then, the speed shift control of the CVT 64 is performed so that the present actual engine revolution speed NE becomes equal to the target engine revolution speed NEt (B4).

In a flow different from the above-described flow, a target engine torque T0 is calculated from the target output P calculated in the block B2 (B5). More specifically, the target engine torque T0 is calculated by dividing the target output P by the present actual engine revolution speed NE as in Expression 2.

$$T0 \leftarrow 30 P/(\pi \cdot NE) \quad (2)$$

The engine torque is controlled so that the actual engine torque reaches the thus-calculated target engine torque T0 (B6). More specifically, the amount of fuel injection or the amount of intake air is adjusted so that the target engine torque T0 is reached. If the present form of combustion is the stratified charge combustion or the semi-stratified charge combustion, the engine torque is adjusted based on the amount of fuel injected. If the present form of combustion is the homogeneous combustion, the engine torque is adjusted based on the amount of intake air, that is, the degree of opening of the throttle valve 46 (degree of throttle opening TA).

An idling control amount QISC learned by an idling control amount calculating process (B7) during idling is added to the amount of fuel injection or the target degree of throttle opening TAT for adjusting the engine torque. The idling control amount QISC is a control amount for keeping the engine revolution speed NE at a target idle revolution speed NT. Since the target degree of throttle opening TAT or the amount of fuel injection calculated in the block B6 is the amount of increase in the engine revolution speed NE or the amount of increase in the vehicle speed V occurring at the time of transition from the idling state to a vehicle running state, it is necessary to add thereto the idling control amount QISC representing the idle revolution speed.

Figure 10:
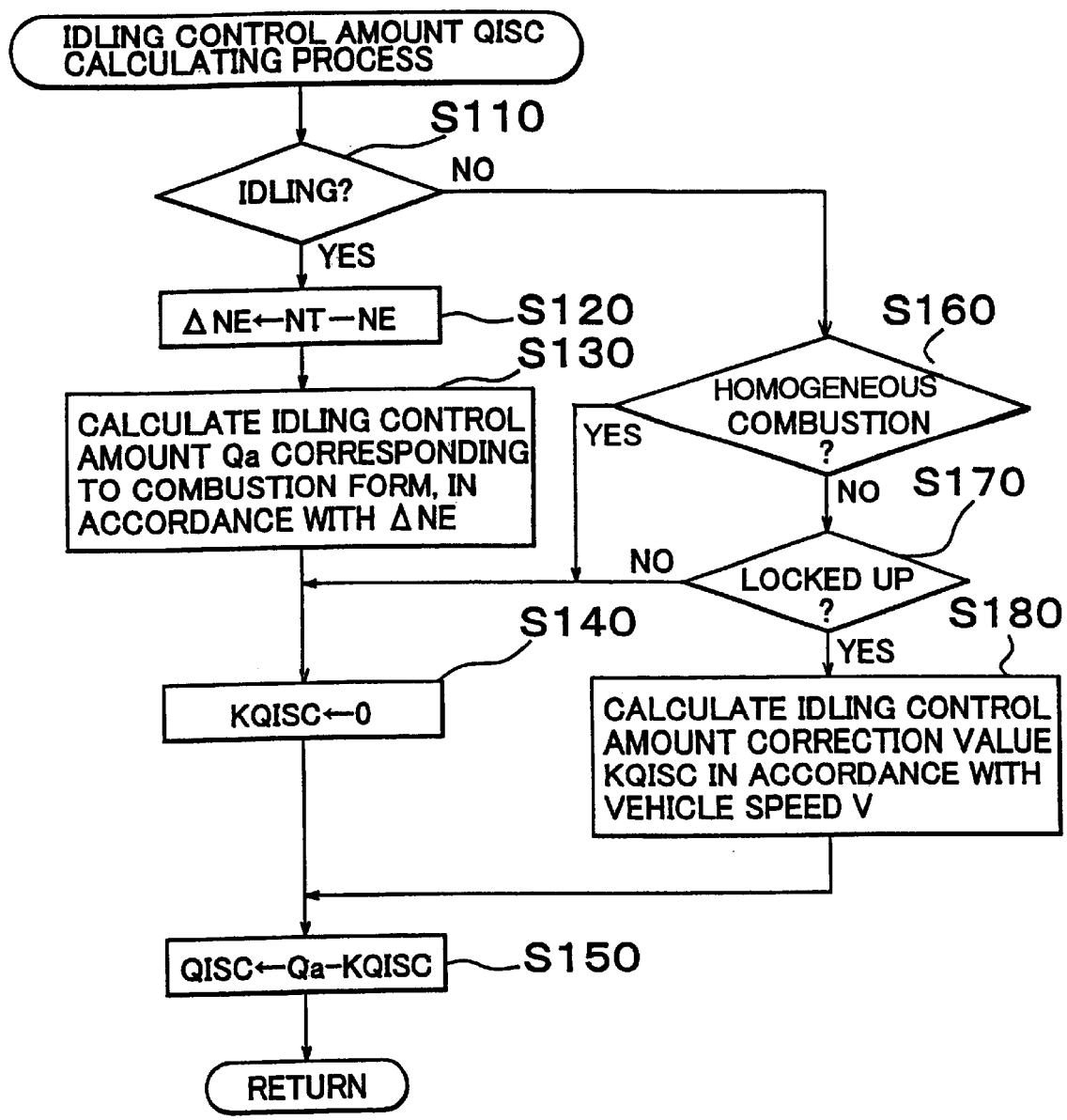
FIG. 10 is a flowchart illustrating an idling control amount QISC calculating process executed by the E-ECU in the first embodiment.

The idling control amount QISC calculating process (B7) is illustrated in the flowchart of FIG. 10. This process is repeated in a fixed time cycle. The steps in the flowchart corresponding to individual processes are represented by "S" in the description below.

When the idling control amount QISC calculating process starts, it is determined whether the engine 2 is presently in the idling state (S110). If the engine 2 is idling ("YES" in S110), a difference ΔNE between the target idle revolution speed NT and the actual engine revolution speed NE is calculated as in Expression 3 (S120).

$$\Delta NE \leftarrow NT-NE \qquad (3)$$

Subsequently, an idling control amount Qa corresponding to the form of combustion is calculated in accordance with the difference ΔNE (S130). That is, in accordance with the difference ΔNE, the idling control amount Qa is determined through a feedback control for bringing the difference ΔNE into a predetermined range, that is, for bringing the engine revolution speed NE to the target idle revolution speed NT. If the present form of combustion is the stratified charge combustion or the semi-stratified charge combustion, the idling control amount Qa is set to a value corresponding to the amount of fuel injected. If the present form of combustion is the homogeneous combustion, the idling control amount Qa is set to a value corresponding to the degree of throttle opening TA. The idling control amount Qa is stored as values different for the individual forms of combustion in the RAM 60c and the backup RAM 60d.

Subsequently, an idling control amount correction value KQISC is set to "0" (S140). Next, the idling control amount correction value KQISC is subtracted from the idling control amount Qa to determine a new idling control amount QISC as in Expression 4 (S150). The process is then temporarily ended.

$$QISC \leftarrow Qa-KQISC \qquad (4)$$

If the engine 2 is in the idling state ("YES" in S110), KQISC=0 is set (S140), so that "QISC=Qa" is provided (S150).

Figure 9:
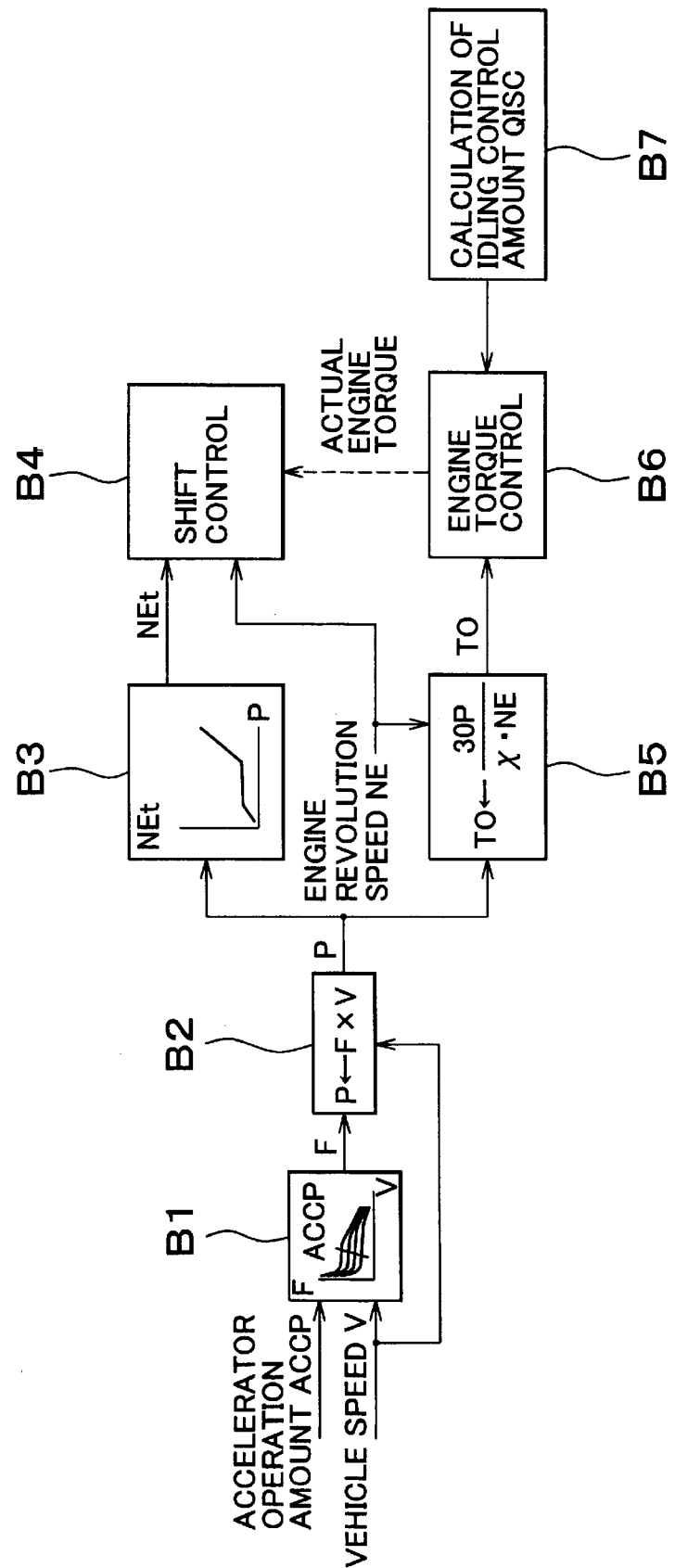
FIG. 9 is a control block diagram of a coordinate control portion performed by the E-ECU and the T-ECU in the first embodiment.

The thus-calculated idling control amount QISC is added to the amount of fuel injection or the target degree of throttle opening TAT calculated in the block B6 to adjust the engine torque as indicated in FIG. 9.

If the engine 2 is not in the idling state ("NO" in S110), it is determined whether the present form of combustion is the homogeneous combustion (S160). If the preset form of combustion is the homogeneous combustion ("YES" in S160), steps S140, S150 are executed. After that, the process is temporarily ended.

Therefore, during the homogeneous combustion while the vehicle is running, the engine torque is adjusted based on the control amount corresponding to the target engine torque T0 determined from the accelerator operation amount ACCP and the vehicle speed V, and the idling control amount QISC (=Qa) determined during the idling state maintained by the homogeneous combustion.

If during the running of the vehicle ("NO" in S110) the homogeneous combustion is not being conducted ("NO" in S160), that is, the form of combustion is the stratified charge combustion or the semi-stratified charge combustion, it is then determined whether the lockup mechanism 62a of the fluidic power transfer mechanism 62 is in the locked-up state (S170). If the lockup mechanism 62a is not locked up ("NO" in S170), steps S140, S150 are executed. After that, the process is temporarily ended.

Therefore, if the lockup mechanism 62a is not in the locked-up state ("NO" in step S170) although the vehicle is running ("NO" in S110) and the selected form of combustion is the stratified charge combustion or the semi-stratified charge combustion ("NO" in S160), the engine torque is adjusted based on the control amount corresponding to the target engine torque T0 determined from the accelerator operation amount ACCP and the vehicle speed V, and the idling control amount QISC (=Qa) determined during the idling state maintained by the stratified charge combustion or the semi-stratified charge combustion.

If the lockup mechanism 62a is locked up ("YES" in S170) while the vehicle is running ("NO" in S110) using the stratified charge combustion or the semi-stratified charge combustion ("NO" in S160), an idling control amount correction value KQISC is calculated in accordance with the vehicle speed V (S180).

Figure 11:
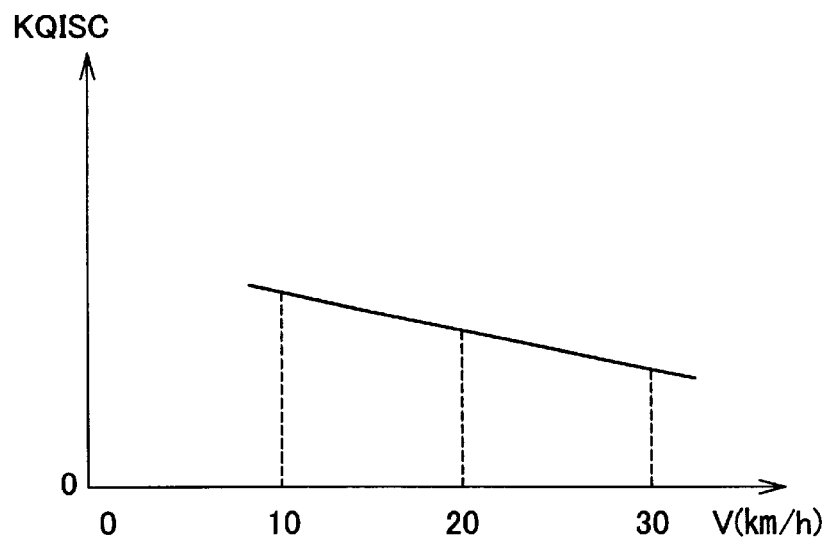
FIG. 11 is a diagram illustrating a one-dimensional map for use for determining an idling control amount correction value KQISC in the idling control amount QISC calculating process in the first embodiment.

The idling control amount correction value KQISC is calculated from a one-dimensional map that is set based on the vehicle speed V with a tendency as indicated in FIG. 11. The idling control amount correction value KQISC indicated in FIG. 11 depends on characteristics of the engine 2 used in the first embodiment attributed to the running resistance of the vehicle, the efficiency of the engine 2, etc. That is, in the engine 2, there is substantially no difference between the amount of fuel consumed when the shift position is in the D range during the idling state maintained by the stratified charge combustion or the semi-stratified charge combustion and the amount of fuel needed to maintain a steady constant running of the vehicle during low-speed running of the vehicle, that is, the generally-termed road load amount of fuel injection, as indicated by open circles in FIG. 12. Therefore, the idling control amount correction value KQISC is provided for correcting the idling control amount QISC in the reducing direction.

After the idling control amount correction value KQISC is calculated as described above, step S150 is executed in which a new idling control amount QISC is calculated by subtracting the idling control amount correction value KQISC from the idling control amount Qa determined during the idling state maintained by the stratified charge combustion or the semi-stratified charge combustion. After that, the process is temporarily ended.

Thus, if the fluidic power transfer mechanism 62 is locked up ("YES" in S170) during the running state of the vehicle ("NO" in S110) maintained by the stratified charge combustion or the semi-stratified charge combustion ("NO" in S160), the idling control amount Qa is corrected in the reducing direction by the amount of the idling control amount correction value KQISC, and the thus-corrected amount is set as the idling control amount QISC (S150).

Next, a lockup control process executed by the T-ECU 66 will be described.

Figure 13:
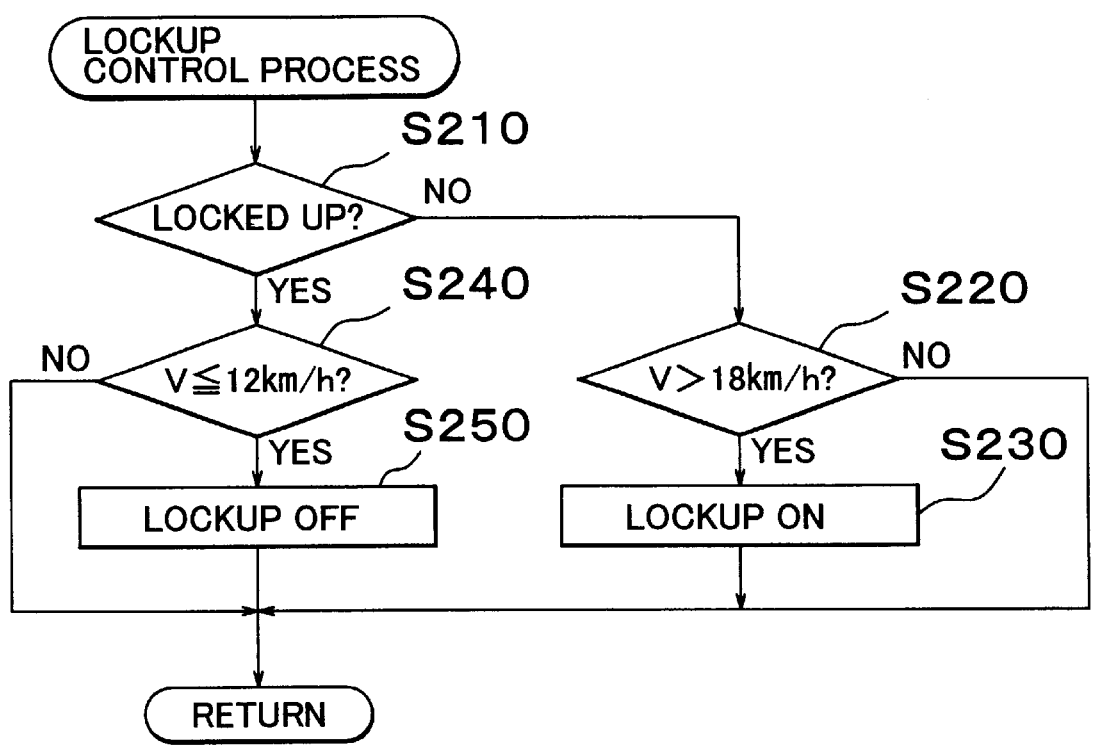
FIG. 13 is a flowchart illustrating a lockup control process executed by the T-ECU in the first embodiment.

The lockup control process is illustrated in the flowchart of FIG. 13. This process is repeated in a fixed time cycle. In this flowchart, if the vehicle speed V increases during the unlocked state, and exceeds, for example, "18 km/h", then the lockup mechanism 62a is locked up. If the vehicle speed V decreases during the locked-up state to or below, for example, "12 km/h", the lockup mechanism 62a is unlocked.

When the lockup control process starts, it is determined whether the lockup mechanism 62a is in the locked-up state, from the state of a flag in the RAM 66c or the state of drive of the lockup actuator 94 (S210).

If the lockup mechanism 62a is not in the locked-up state ("NO" in S210), it is subsequently determined whether the vehicle speed V is higher than 18 km/h (S220). If V≦18 km/h ("NO" in S220), the process is ended temporarily. If V>18 km/h ("YES" in S220), the lockup actuator 94 is driven to lock up the lockup mechanism 62a (LOCKUP ON) (S230). After that, the process is temporarily ended.

Conversely, if it is determined in S210 that the lockup mechanism 62a is in the locked-state ("YES" in S210), it is subsequently determined whether the vehicle speed V is at most 12 km/h (S240). If V>12 km/h ("NO" in S240), the process is temporarily ended without any further processing. If V≦12 km/h ("YES" in S240), the lockup actuator 94 is driven to unlock the lockup mechanism 62a (LOCKUP OFF) (S250). After that, the process is temporarily ended.

In the above-described construction, steps S150 to S180 in the idling control amount QISC calculating process (FIG. 10) correspond to a process as a vehicle run-time fuel supply amount correcting means.

The first embodiment as described above achieves the following advantages.

Due to the processing of steps S180 and S150, the idling control amount QISC determined by reducing the idling control amount Qa by the idling control amount correction value KQISC is reflected in the amount of fuel injected (corresponding to the amount of fuel supplied) for the lean combustion during the running of the vehicle.

Thus, the idling control amount Qa calculated to hold the engine revolution speed NE at the target idle revolution speed NT during the idling speed control is not immediately reflected in the amount of fuel injected for the homogeneous combustion during the running of the vehicle, but is reflected therein after the idling control amount Qa is corrected in the reducing direction by the idling control amount correction value KQISC.

Figure 12:
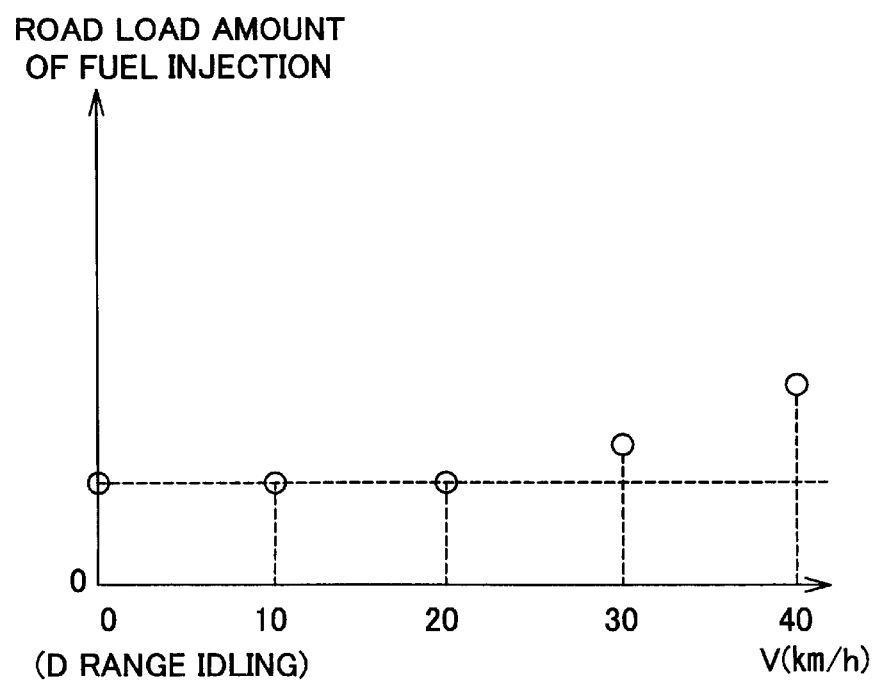
FIG. 12 us a graph indicating a tendency of the road load amount of fuel injection in the engine in the first embodiment.

Therefore, in the engine 2 of the embodiment, in which during the lean combustion with the D range selected, there is substantially no difference between the road load amount of fuel injected during the idling state and the road load amount of fuel injected during a low-speed running of the vehicle as indicated by the open circles in FIG. 12, an increase in the amount of fuel injection during the low-speed running of the vehicle based on the lean combustion achieved upon a fuel increase request does not result an excessively great output torque of the engine 2, so that the low-speed running becomes stable and good drivability can be maintained.

Furthermore, since needless fuel injection that can cause unstable torque control is not performed, fuel economy improves.

The running resistance of the vehicle changes in accordance with the vehicle speed V. In the first embodiment, the idling control amount correction value KQISC is determined in accordance with the vehicle speed V corresponding to the running resistance of the vehicle, and the idling control amount Qa is reduced for correction by the correction value KQISC. Therefore, the controllability of the output torque of the engine 2 improves, so that the low-speed running of the vehicle becomes more stable, and better drivability can be maintained.

In the first embodiment, the vehicle is equipped with the transmission mechanism 3 having the fluidic power transfer mechanism 62 that can assume the locked-up state. Therefore, while the fluidic power transfer mechanism 62 is not locked up, the efficiency of transfer of the output torque of the engine 2 is low, so that an excessive increase in the output torque of the engine 2, if any, has only a reduced effect on the running state of the vehicle.

Therefore, due to the determining process of step S170, the reducing correction based on the idling control amount correction value KQISC is not performed on the engine 2 operated in the lean combustion mode during the running of the vehicle with the lockup mechanism 62a being in the unlocked state ("NO" in S170). Hence, since the lockup mechanism 62a is in the unlocked state, a stabilized low-speed running of the vehicle can be maintained even if injection of an excessive amount of fuel is performed. Furthermore, due to the fuel increase effect, the anti-engine stall characteristic during the low-speed running of the vehicle can be improved.

Furthermore, since the vehicle running speed is relatively high when the vehicle is running with the locked-up state ("YES" in S170), a good anti-engine stall characteristic can be maintained even if the amount of fuel injected is reduced. Furthermore, since the controllability of the output torque of the engine 2 improves, the low-speed running of the vehicle continues to be in a stable state, and good drivability is maintained.

Figure 14:
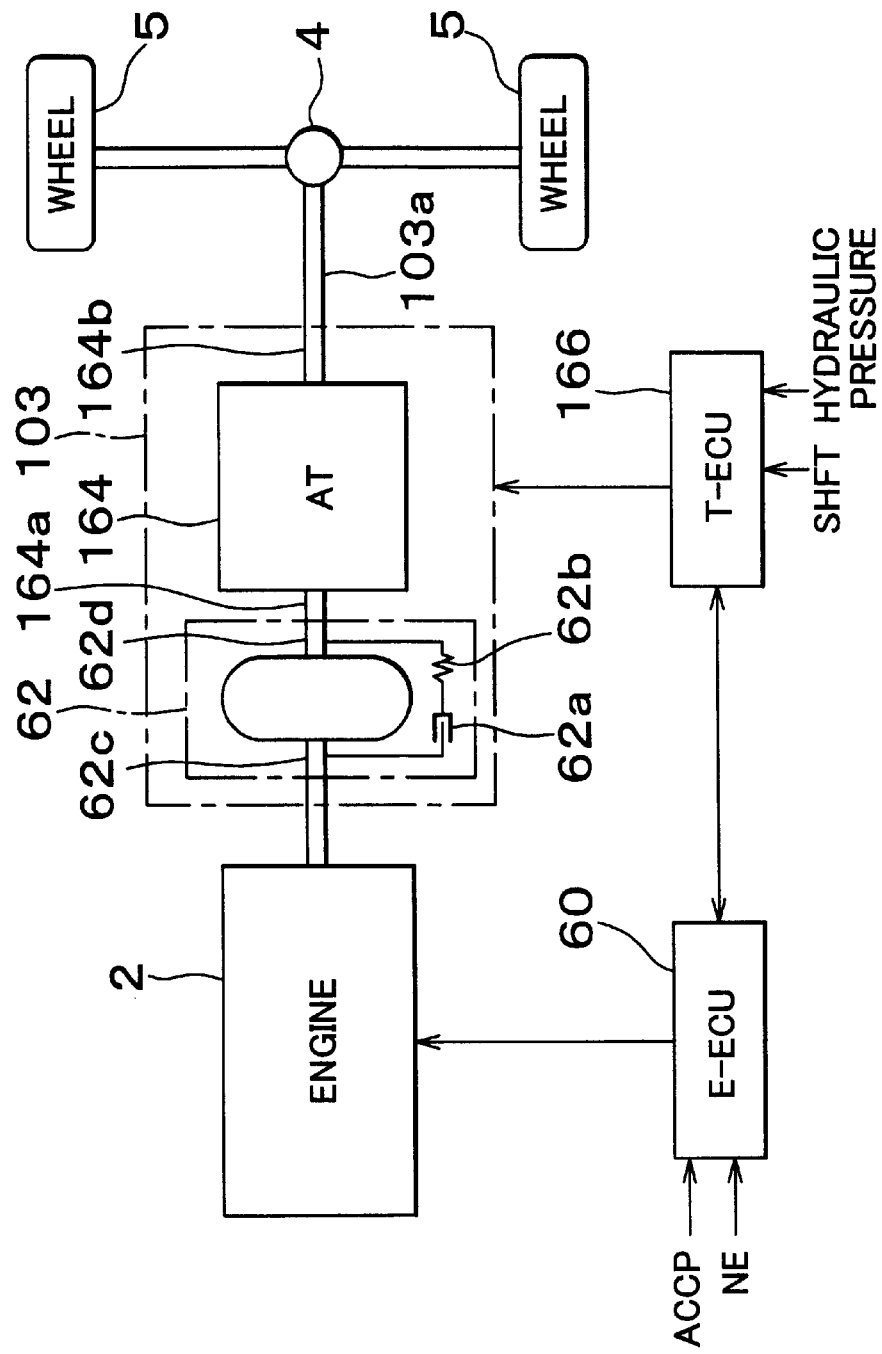
FIG. 14 is a schematic block diagram of a drive system and a control system of a motor vehicle in accordance with a second embodiment of the invention.

FIG. 14 is a schematic block diagram of a drive system and a control system for a motor vehicle in accordance with a second embodiment of the invention. The second embodiment differs from the first embodiment in that a transmission mechanism 103 includes an automatic transmission (hereinafter, referred to as "AT") 164 that changes the speed ratio by shifting gears, instead of the CVT 64, and a T-ECU 166 for controlling the AT 164 is provided. An input shaft 164a of the AT 164 is coupled to the output shaft 62d of the fluidic power transfer mechanism, while the output shaft 164b of the AT 164 is coupled to the output shaft 103a of the transmission mechanism. Other constructions of the second embodiment are basically the same as those of the first embodiment. Except for the components and portions particularly described below, components, portions and the like of the second embodiment represented by the same reference characters as used in conjunction with the first embodiment have the same constructions and functions as those of the comparable components and the like of the first embodiment. The hardware construction of the E-ECU 60 and the construction of the engine 2 are represented by the same reference characters as used in conjunction with the first embodiment, and will not be described in detail again.

Figure 15:
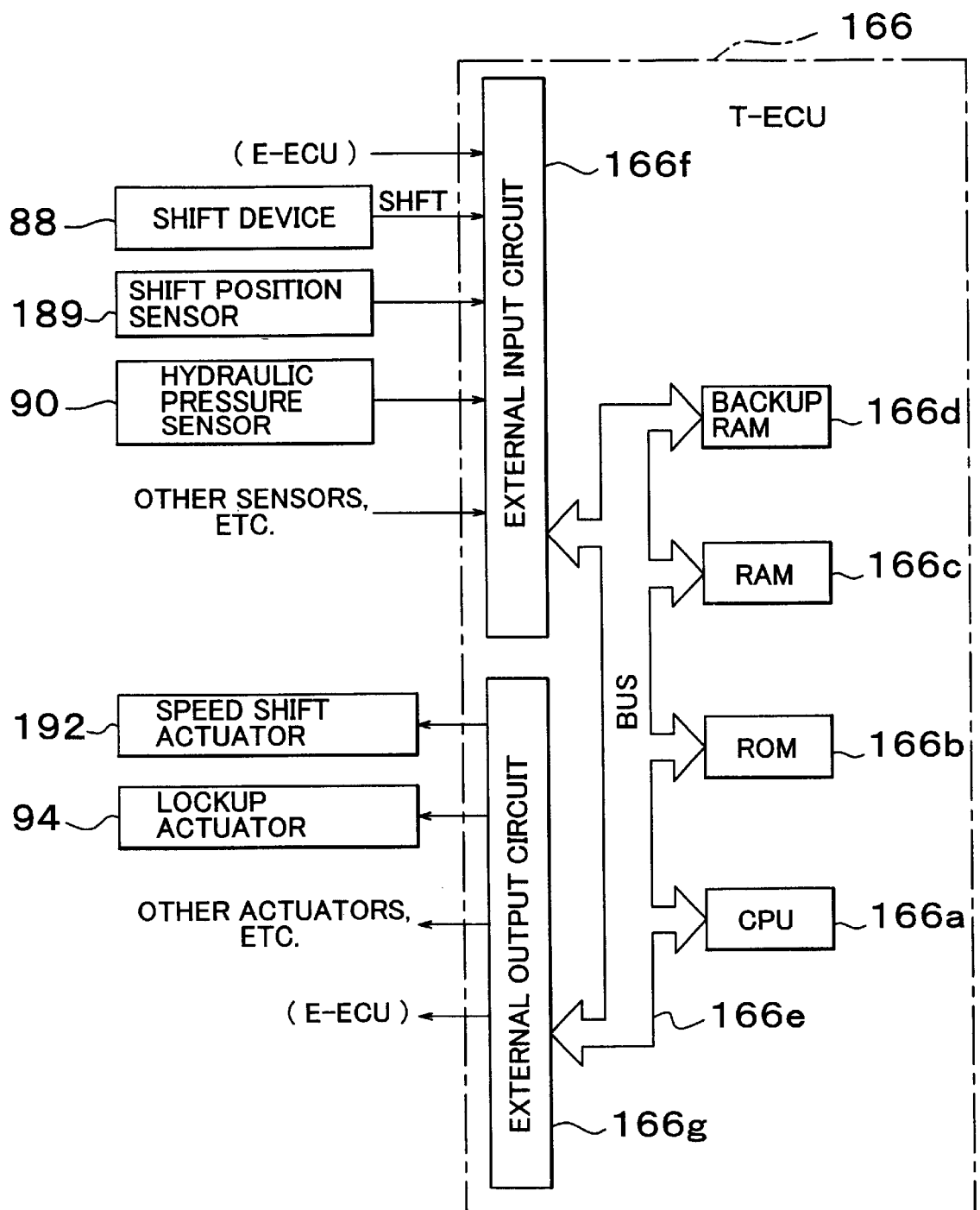
FIG. 15 is a block diagram illustrating the construction of a T-ECU in the second embodiment.

The construction of the T-ECU 166 is illustrated in the block diagram of FIG. 15. The T-ECU 166 is a control unit that performs an automatic speed shift by controlling the lockup mechanism 62a and the AT 164. The T-ECU 166 is formed as a logic circuit having a CPU 166a, a ROM 166b, a RAM 166c, a backup RAM 166d, a bus 166e, an external input circuit 166f, an external output circuit 166g, etc. These components 166a to 166g perform basically the same functions as those in the T-ECU 66. The external input circuit 166f is connected to a shift device 88 that outputs a shift signal SHFT, a shift position sensor 189 for detecting a gear speed of the AT 164, a hydraulic pressure sensor 90 for detecting the hydraulic pressure for driving the lockup mechanism 62a, and other sensors and the like. The external output circuit 166g is connected to a speed shift actuator 192 for changing the gear speed of the AT 164 by shifting gears in the AT 164, a lockup actuator 94 for switching the lockup mechanism 62a of the fluidic power transfer mechanism 62, and other actuators and the like. The T-ECU 166 is connected in terms of signals to the E-ECU 60 via the external input circuit 166f and the external output circuit 166g, for mutual communications with the E-ECU 60.

The T-ECU 166 executes a lockup control process of changing the lockup mechanism 62*a* of the fluidic power transfer mechanism 62 between a locked-up state and an unlocked state in accordance with the vehicle speed V. This lockup control process is the same as the lockup control process of the first embodiment illustrated in FIG. 13.

Figure 16:
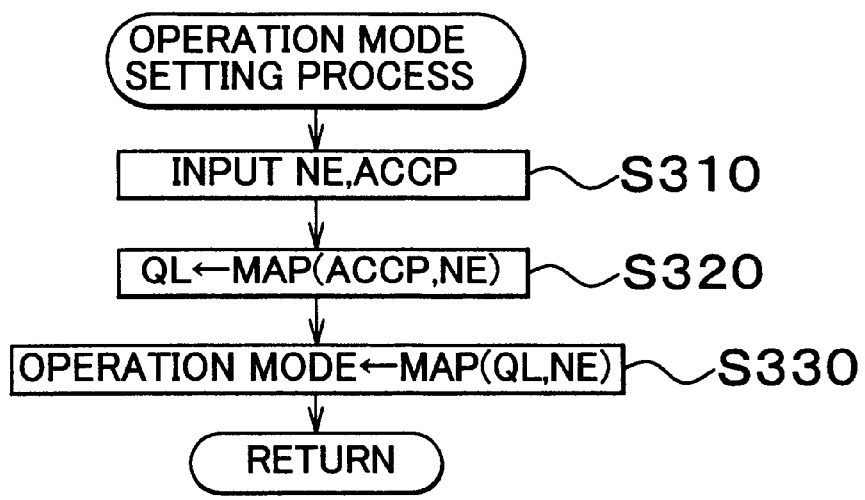
FIG. 16 is a flowchart illustrating an operation region setting process executed by an E-ECU in the second embodiment.

Processes executed by the E-ECU 60 will be described. The flowchart of FIG. 16 illustrates an operation region setting process of setting an operation region that is needed for the fuel injection control. This process is cyclically executed at every pre-set crank angle.

The E-ECU 60 first inputs the engine revolution speed NE determined from the signal of the engine speed sensor 70 and the accelerator operation amount ACCP determined from the signal of the accelerator depression sensor 74, into a work area in the RAM 60*c* (S310).

Figure 17:
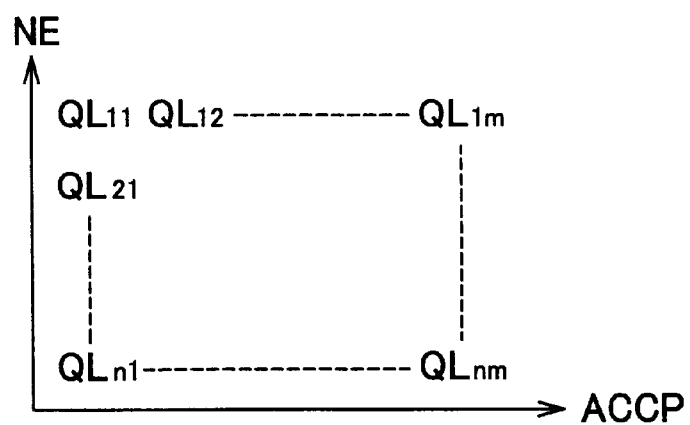
FIG. 17 is a diagram illustrating a two-dimensional map for use for determining a lean fuel injection amount QL in the operation region setting process in the second embodiment.

Subsequently, the E-ECU 60 calculates a lean fuel injection amount QL based on the engine revolution speed NE and the accelerator operation amount ACCP (S320). The lean fuel injection amount QL represents an optimal amount of fuel injection for bringing the output torque of the engine 2 to a requested torque during the stratified charge combustion mode. The lean fuel injection amount QL is empirically determined, and is stored in the ROM 60*b* beforehand in the form of a map that employs the accelerator operation amount ACCP and the engine revolution speed NE as parameters as indicated in FIG. 17. In step S320, the E-ECU 60 determines a lean fuel injection amount QL based on the map. It should be noted herein that values are discretely arranged in the map, and that if there is no matching value as a parameter, a matching value is determined through interpolating calculation. The calculation from the map via interpolation is likewise performed in order to determine a necessary value from a map other than the map of the lean fuel injection amount QL, as well.

Figure 18:
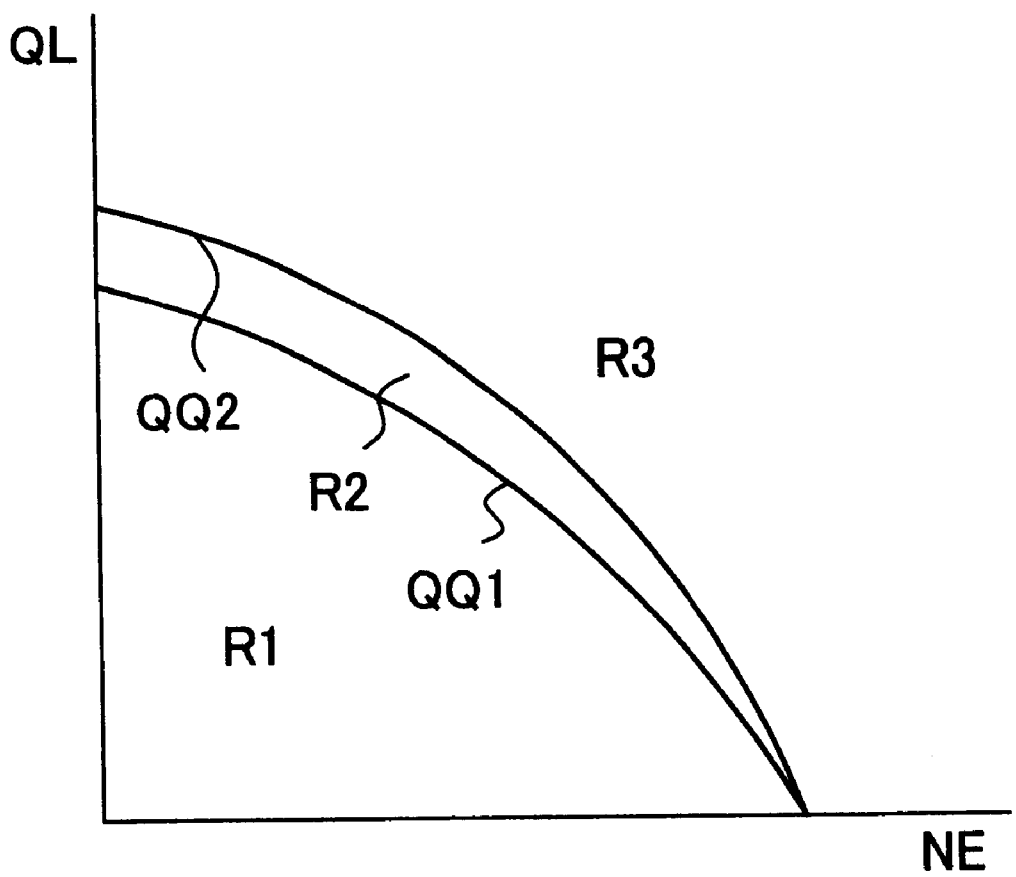
FIG. 18 is a diagram illustrating a two-dimensional map for use for setting an operation region in the operation region setting process in the second embodiment.

Subsequently, based on the lean fuel injection amount QL and the engine revolution speed NE, the E-ECU 60 sets one of three regions R1, R2, R3 defined in a map as shown in FIG. 18, as an operation region (S330). After that, the E-ECU 60 temporarily ends the process. As for the map shown in FIG. 18, an appropriate form of fuel injection is empirically determined in accordance with the lean fuel injection amount QL and the engine revolution speed NE beforehand. Appropriate forms of fuel injection are pre-stored in the ROM 60*b* in the form of a map in which the lean fuel injection amount QL and the engine revolution speed NE are parameters.

After one of the operation regions R1 to R3 is set as described above, the form of fuel injection is controlled in accordance with the set operation region. That is, in the operation region R1 in which the lean fuel injection amount QL and the engine revolution speed NE are less than a boundary line QQ1 as indicated in FIG. 18, the stratified charge combustion is conducted by injecting an amount of fuel corresponding to the lean fuel injection amount QL during a late period in the compression stroke.

In the operation region R2 where the lean fuel injection amount QL and the engine revolution speed NE are above the boundary line QQ1 but below a boundary line QQ2, the semi-stratified charge combustion is conducted by injecting an amount of fuel corresponding to the lean fuel injection amount QL in two doses, that is, once during the intake stroke and once during a late period in the compression stroke.

In the operation region R3 where the lean fuel injection amount QL and the engine revolution speed NE are greater than the boundary line QQ2, the homogeneous combustion is conducted by injecting an amount of fuel corrected in various manners based on the stoichiometric air-fuel ratio basic fuel injection amount QBS, during the intake stroke.

Figure 19:
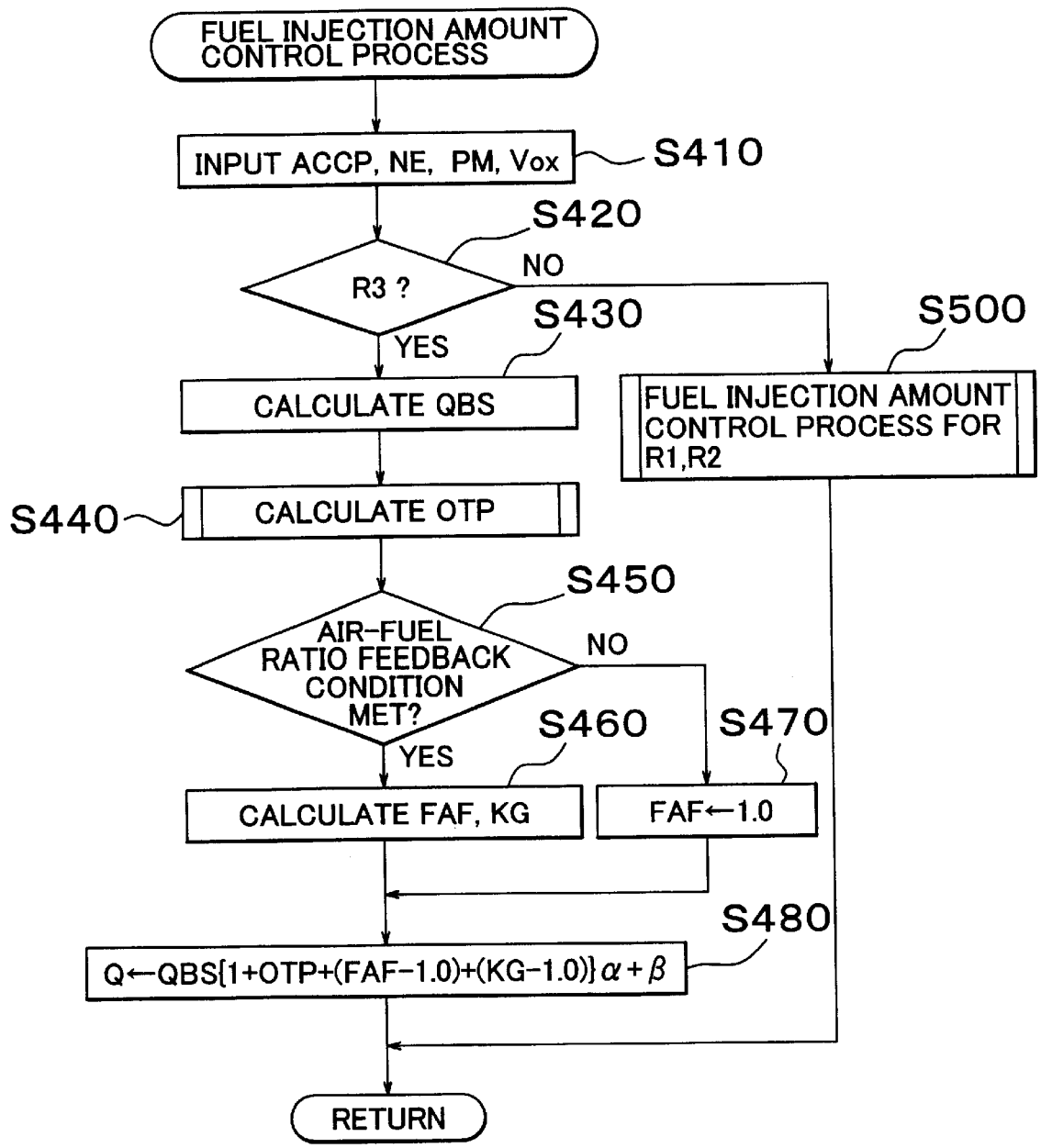
FIG. 19 is a flowchart illustrating a fuel injection amount control process executed by the E-ECU in the second embodiment.
Figure 20:
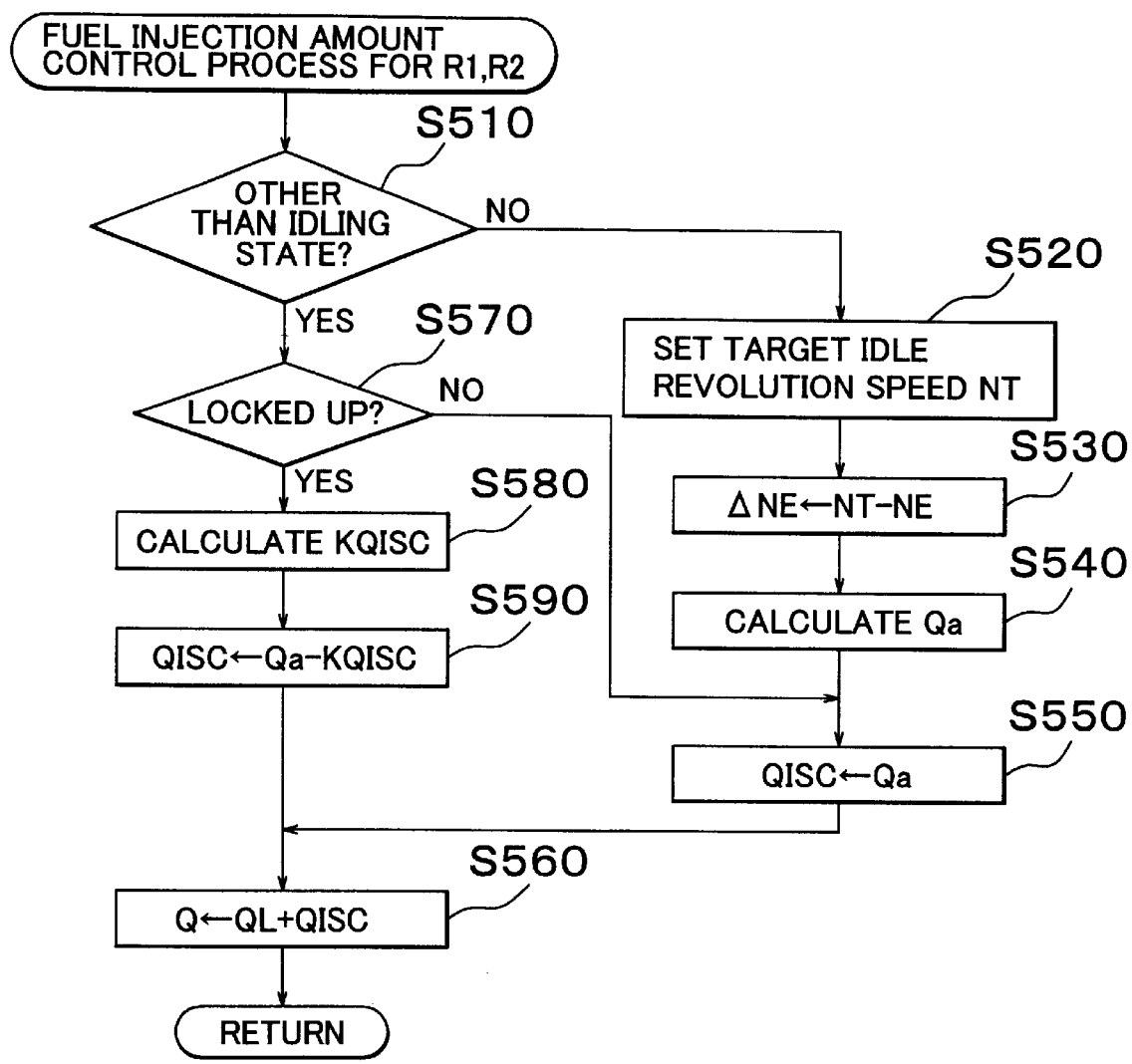
FIG. 20 is a flowchart illustrating a fuel injection amount control process for the operation region R1 or R2 executed by the E-ECU in the second embodiment.

FIGS. 19 and 20 show flowcharts of a fuel injection amount control process executed by the E-ECU 60 based on the operation region set in the above-described operation region setting process. The fuel injection amount control process is cyclically executed at every pre-set crank angle.

When the fuel injection amount control process starts, the E-ECU 60 inputs the accelerator operation amount ACCP determined from the signal of the accelerator depression sensor 74, the engine revolution speed NE determined from the signal of the engine speed sensor 70, the intake pressure PM determined from the signal of the intake pressure sensor 76, and the detected air-fuel ratio value Vox determined from the signal of the air-fuel ratio sensor 78, into a work area in the RAM 60*c* (S410).

Figure 21:
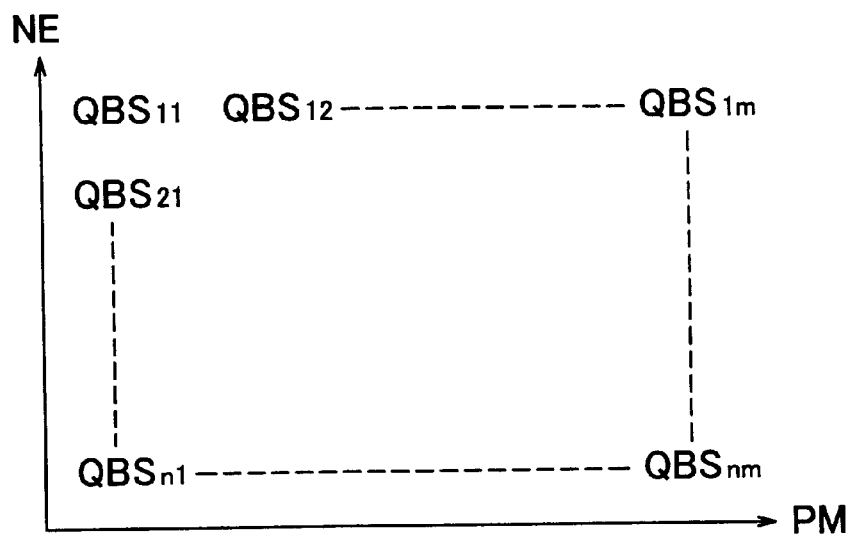
FIG. 21 is a diagram illustrating a two-dimensional map for use for calculating a stoichiometric air-fuel ratio basic fuel injection amount QBS in the fuel injection amount control process of the second embodiment.

Subsequently, the E-ECU 60 determines whether the operation region R3 is presently set due to the above-described operation region setting process (FIG. 16) (S420). If it is determined that the present operation region is the operation region R3 ("YES" S420), the E-ECU 60 calculates a stoichiometric air-fuel ratio basic fuel injection amount QBS from the intake pressure PM and the engine revolution speed NE by using a map of FIG. 21 pre-set in the ROM 60*b* (S430).

Figure 22:
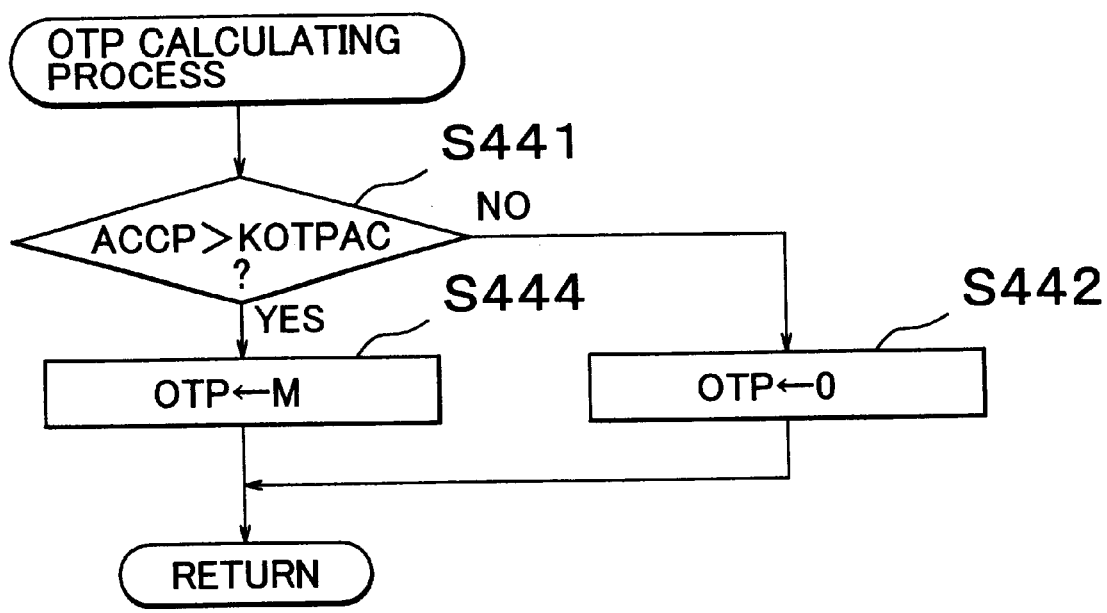
FIG. 22 is a flowchart illustrating a high-load increase amount OTP calculating process executed by the E-ECU in the second embodiment.

Next, the E-ECU 60 executes a process of calculating a high-load increase amount OTP (S440). The high-load increase amount OTP calculating process will be described with reference to the flowchart shown in FIG. 22. In the high-load increase amount OTP calculating process, it is determined whether the accelerator operation amount ACCP is greater than a high-load increase amount criterion KOTPAC (S441). If ACCP≦KOTPAC ("NO" in S441), the high-load increase amount OTP is set to "0" (S442). That is, the fuel-increasing correction is not performed. After that, the E-ECU 60 temporarily goes out of the high-load increase amount OTP calculating process.

Conversely, if ACCP>KOTPAC ("YES" in S441), a value M (e.g., 1>M>0) is set as a high-load increase amount OTP (S444). That is, execution of a fuel-increasing correction is set. This increasing correction is performed in order to prevent overheating of the catalytic converter 49 during a high-load operation.

Referring back to FIG. 19, after calculating the high-load increase amount OTP in S440, it is determined whether an air-fuel ratio feedback condition is met (S450). That is, it is determined whether all the following conditions are met: (1) the present state is not a starting-up state; (2) warm-up has been completed (for example, cooling water temperature THW≦40° C.); (3) the air-fuel ratio sensor 78 has been activated; and (4) the value of the high-load increase amount OTP is "0".

If the air-fuel ratio condition is met ("YES" in S450), the E-ECU 60 calculates an air-fuel ratio feedback factor FAF and a learned value KG thereof (S460). The air-fuel ratio feedback factor FAF is calculated based on the output of the air-fuel ratio sensor 78. The learned value KG is a value for storage of an amount of deviation of the air-fuel ratio feedback factor FAF from a center value of "1.0". As for the art of air-fuel ratio feedback control using the aforementioned values, there are various known techniques, as described in, for example, in Japanese Patent Application Laid-Open No. 6-10736 (U.S. Pat. No. 5,406,927).

Conversely, if the air-fuel ratio feedback condition is not met ("NO" in S450), the air-fuel ratio feedback factor FAF is set to "1.0" (S470).

Subsequent to steps S460 or S470, the E-ECU 60 determines an amount of fuel injection Q as in Expression 5 (S480).

$$Q \leftarrow QBS\{1+OTP+(FAF-1.0)+(KG-1.0)\}\alpha+\beta \qquad (5)$$

In Expression 5, α and β are correction factors that are appropriately set in accordance with the type of the engine 2 and the content of control.

After that, the E-ECU 60 temporarily ends the fuel injection amount control process.

Conversely, if it is determined in S420 that the present operation region is other than the operation region R3, that is, either one of the operation regions R1 and R2 (the stratified charge combustion and the semi-stratified charge combustion) ("NO" in S420), the E-ECU 60 performs the fuel injection amount control process for the operation regions R1 and R2 illustrated in FIG. 20 (S500).

First, it is determined whether the engine 2 is in an other-than-idling state (S510). If the engine 2 is idling ("NO" in S510), a target idle revolution speed NT for the operation region R1 or R2 is set based on the state of operation of the engine 2 (e.g., the cooling water temperature THW, the presence/absence of loads of accessories, such as an air-conditioner and the like, etc.) (S520). Subsequently, a difference ΔNE between the target idle revolution speed NT and the actual engine revolution speed NE is calculated (S530). In accordance with the difference ΔNE, an idling control amount Qa for keeping the engine revolution speed NE at the target idle revolution speed NT is calculated as in the first embodiment (S540). The idling control amount Qa is stored in the RAM 60c and the backup RAM 60d.

Next, the idling control amount Qa is set as an idling control amount QISC (S550). Subsequently, the idling control amount QISC is added to the lean fuel injection amount QL determined in step S320 in the operation region setting process (FIG. 16) to set an amount of fuel injection Q (S560), as in Expression 6. After that, the fuel injection amount control process is temporarily ended.

$$Q \leftarrow +QL+QISC \qquad (6)$$

Conversely, if the engine 2 is in an other-than-idling state, that is, if the vehicle is running ("YES" in S510), it is determined whether the lockup mechanism 62a is in the locked-up state based on data received from the T-ECU 166 (S570). If the lockup mechanism 62a is not in the locked-up state ("NO" in S570), steps S550 and S560 are executed, so that the idling control amount QISC is immediately reflected in the amount of fuel injection Q for the running of the vehicle. After that, the fuel injection amount control process is temporarily ended.

If the lockup mechanism 62a is in the locked-up state ("YES" in S570), an idling control amount correction value KQISC is calculated (S580). The idling control amount correction value KQISC is calculated from the vehicle speed V, by using the one-dimensional map shown in FIG. 11 described above in conjunction with the first embodiment.

The idling control amount correction value KQISC indicated in FIG. 11 depends on characteristics of the engine 2 used in the second embodiment attributed to the running resistance of the vehicle, the efficiency of the engine 2, etc, as mentioned above in conjunction with the first embodiment. That is, in the engine 2, there is substantially no difference between the amount of fuel consumed when the engine 2 is in the operation region R1 or R2 and the shift position is in the D range during the idling state and the amount of fuel needed to maintain a steady constant running of the vehicle during low-speed running of the vehicle, that is, the generally-termed road load amount of fuel injection, as indicated by open circles in FIG. 12. Therefore, the idling control amount correction value KQISC is provided for correcting the idling control amount QISC in the reducing direction.

Subsequently, the idling control amount correction value KQISC determined in step S580 is subtracted from the idling control amount Qa stored in step S540 during the idling state of the engine 2, thereby determining a new idling control amount QISC as in Expression 7 (S590).

$$QISC \leftarrow Qa-KQISC \qquad (7)$$

Subsequently, the amount of fuel injection Q is set by using the idling control amount QISC reduced by the correction in step S590, as in Expression 6 (S560). Thus, the reduced idling control amount QISC is reflected in the amount of fuel injection Q for the running of the vehicle. After that, the fuel injection amount control process is temporarily ended.

Although not indicated in the drawings, the idle revolution speed control in the operation region R3 (the homogeneous combustion) is performed by controlling the degree of throttle opening TA via the throttle valve-driving motor 44. The idling control amount QISC acquired as the degree of throttle opening TA during the idling based on the homogeneous combustion is reflected in the degree of throttle opening TA during the running of the vehicle based on the homogeneous combustion.

In the above-described construction, steps S570 to S590 correspond to a process as a vehicle run-time fuel supply amount correcting means.

The above-described second embodiment achieves substantially the same advantages as those of the first embodiment.

Figure 23:
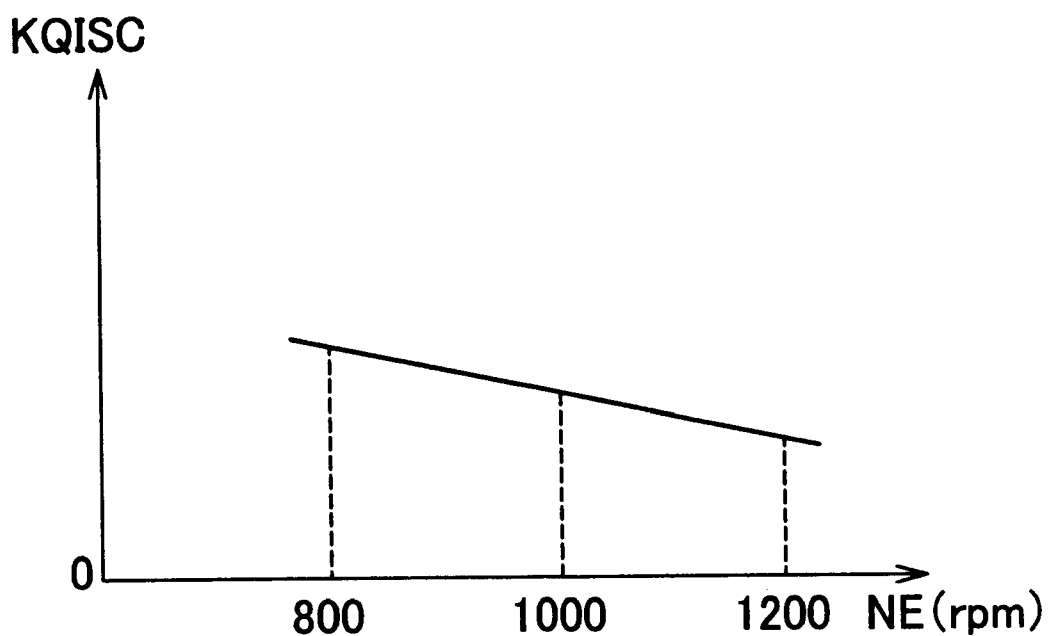
FIG. 23 is a diagram illustrating a modification of the one-dimensional map for calculating the idling control amount correction value KQISC in the first and second embodiments.

In the first and second embodiments, the idling control amount correction value KQISC is determined from the vehicle speed V by using the onedimensional map shown in FIG. 11. Instead of setting the idling control amount correction value KQISC by using the vehicle speed V as a parameter, it is also possible to set the idling control amount correction value KQISC in accordance with the engine revolution speed NE as indicated in FIG. 23. Furthermore, the idling control amount correction value KQISC may also be set by using a combination of the vehicle speed V and the engine revolution speed NE.

While the vehicle is running, the efficiency of the engine 2 changes with the engine revolution speed NE. Therefore, if a control amount obtained through the reducing correction of the idling control amount QISC in accordance with the engine revolution speed NE during the running of the vehicle is reflected in the amount of fuel injection Q for the homogeneous combustion during the running of the vehicle, an appropriate amount of fuel injection Q can be obtained corresponding to the efficiency of the engine 2 during the running of the vehicle. Hence, the controllability of the output torque of the engine 2 during the running of the vehicle improves, so that the low-speed running of the vehicle becomes further stable, and good drivability can be maintained.

Although in the first and second embodiments, the fluidic power transfer mechanism 62 is a torque converter, the invention is also applicable if the fluidic power transfer mechanism is, for example, a fluidic clutch having a lockup mechanism. Such an application achieves substantially the same advantages as stated above.

Although in the first embodiment, the CVT 64 is a belt-type continuously variable transmission, the CVT 64 may instead be, for example, a toroidal continuously variable transmission or the like, as well.

In the first and second embodiments, the lean combustion is accomplished in the form of the stratified charge combustion or the semi-stratified charge combustion. However, the lean combustion may also be in other forms, for example, in the form of generally termed lean burn, that is, a homogeneous lean combustion in which fuel is homogeneously mixed with intake air at a ratio that is on the fuel-lean side of the stoichiometric air-fuel ratio and such a homogeneous mixture is ignited. Such a homogeneous lean combustion does not substantially cause a difference between the amounts of fuel supply needed during the idling of the engine 2 and during the low-speed running of the vehicle. Therefore, adoption of the homogeneous lean combustion achieves substantially the same advantages as stated above if a construction substantially the same as those in the first and second embodiments is adopted.

In step S150 in the first embodiment, the idling control amount correction value KQISC is subtracted from the idling control amount Qa to set a new idling control amount QISC as in Expression 4. However, a new idling control amount QISC may also be set by multiplying the idling control amount Qa by an idling control amount correction value KQISC. In this case, the idling control amount correction value KQISC determined in S180 is 0<KQISC<1, and the value set as the idling control amount correction value KQISC in step S140 is "1". Furthermore, the map as indicated in FIG. 11 is set so as to represent a relationship in which the idling control amount correction value KQISC increases with increases in the vehicle so speed V.

Similarly, in step S590 in the second embodiment, the idling control amount correction value KQISC is subtracted from the idling control amount Qa to set a new idling control amount QISC as in Expression 7. However, a new idling control amount QISC may also be set by multiplying the idling control amount Qa by an idling control amount correction value KQISC. In this case, the idling control amount correction value KQISC determined in S580 is 0<KQISC<1. Furthermore, the map as indicated in FIG. 11 is set so as to represent a relationship in which the idling control amount correction value KQISC increases with increases in the vehicle speed V.

As indicated in FIGS. 11 or 23, the idling control amount correction value KQISC is changed in accordance with the vehicle speed V or the engine revolution speed NE. However, it is also practicable to maintain a constant idling control amount correction value KQISC regardless of the vehicle speed V or the engine revolution speed NE, for the purpose of simplifying the process and economizing the use of memory.

In the first and second embodiments, the idle revolution speed is controlled to the target idle revolution speed based on the degree of throttle opening TA during the idling state maintained by the homogeneous combustion. However, if an idling speed control valve bypassing the throttle valve 46 is provided, the degree of opening of the idling speed control valve may be adjusted during the idling state maintained by the homogeneous combustion.

In the illustrated embodiment, the controller (the E-ECU 60) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A fuel supply amount control apparatus for a spark ignition type internal combustion engine that is installed in a vehicle and that allows a lean combustion of a mixture in which a proportion of fuel is less than in a mixture having a stoichiometric air-fuel ratio, the fuel supply amount control apparatus comprising:

idling control amount calculating means for calculating an idling control amount for keeping a revolution speed of the internal combustion engine at a target idle revolution speed during an idling state of the engine;

fuel supply amount adjusting means for adjusting an amount of fuel supplied to the engine based on the idling control amount if the lean combustion is conducted during the idling state; and vehicle run-time fuel supply amount correcting means for determining the amount of fuel supplied for the lean combustion during a run of the vehicle using a control amount obtained by reducing the idling control amount.

2. A fuel supply amount control apparatus according to claim 1, wherein the vehicle run-time fuel supply amount correcting means reduces the idling control amount in accordance with a running speed of the vehicle for the lean combustion during the run of the vehicle.

3. A fuel supply amount control apparatus according to claim 1, wherein the vehicle run-time fuel supply amount correcting means reduces the idling control amount in accordance with the revolution speed of the engine for the lean combustion during the run of the vehicle.

4. A fuel supply amount control apparatus according to claim 1, further comprising a transmission mechanism having a fluidic power transfer mechanism that transfers a drive power between an input shaft and an output shaft via a fluid and that assumes a locked-up state in which the input shaft and the output shaft are interlocked when necessary, wherein when the fluidic power transfer mechanism is in the locked-up state, the vehicle run-time fuel supply amount correcting means reduces the idling control amount for the lean combustion during the run of the vehicle, and when the fluidic power transfer mechanism is in an unlocked state, the vehicle run-time fuel supply amount correcting means does not reduce the idling control amount or reduces the idling control amount to a lesser extent than during the locked-up state for the lean combustion during the run of the vehicle.

5. A fuel supply amount control apparatus according to claim 1, wherein the lean combustion is a stratified charge combustion in which a high-fuel concentration layer is formed by using an amount of fuel whose proportion to an amount of intake air is less than a fuel-to-intake air proportion represented by the stoichiometric air-fuel ratio and the high-fuel concentration layer is ignited.

6. A fuel supply amount control apparatus according to claim 1, wherein the lean combustion is a homogeneous lean combustion in which a mixture is formed by homogeneously mixing an amount of intake air with an amount of fuel whose proportion to the amount of intake air is less than a fuel-to-intake air proportion represented by the stoichiometric air-fuel ratio and the mixture is ignited.

7. A fuel supply amount control apparatus according to claim 1, further comprising a transmission mechanism having a fluidic power transfer mechanism that transfers a drive power between an input shaft and an output shaft via a fluid and that assumes a locked-up state in which the input shaft and the output shaft are interlocked when a running speed of the vehicle becomes higher than a reference speed, wherein when the fluidic power transfer mechanism is in the locked-up state, the vehicle run-time fuel supply amount correcting means reduces the idling control amount during the run of the vehicle, and when the fluidic power transfer mechanism is in an unlocked state, the vehicle run-time fuel supply amount correcting means does not reduce the idling control amount or reduces the idling control amount to a lesser extent than during the locked-up state during the run of the vehicle.

8. A fuel supply amount control apparatus for a spark ignition type internal combustion engine that is installed in a vehicle and that allows a lean combustion of a mixture in which a proportion of fuel is less than in a mixture having a stoichiometric air-fuel ratio, the fuel supply amount control apparatus comprising a controller that:

calculates an idling control amount for keeping a revolution speed of the internal combustion engine at a target idle revolution speed during an idling state of the engine;

adjusts an amount of fuel supplied to the engine based on the idling control amount if the lean combustion is conducted during the idling state; and determines the amount of fuel supplied for the lean combustion during a run of the vehicle using a control amount obtained by reducing the idling control amount.

9. A fuel supply amount control apparatus according to claim 8, wherein the controller reduces the idling control amount in accordance with a running speed of the vehicle for the lean combustion during the run of the vehicle.

10. A fuel supply amount control apparatus according to claim 8, wherein the controller reduces the idling control amount in accordance with the revolution speed of the engine for the lean combustion during the run of the vehicle.

11. A fuel supply amount control apparatus according to claim 8, further comprising a transmission mechanism having a fluidic power transfer mechanism that transfers a drive power between an input shaft and an output shaft via a fluid and that assumes a locked-up state in which the input shaft and the output shaft are interlocked when necessary, wherein when the fluidic power transfer mechanism is in the locked-up state, the controller reduces the idling control amount for the lean combustion during the run of the vehicle, and when the fluidic power transfer mechanism is in an unlocked state, the controller does not reduce the idling control amount or reduces the idling control amount to a lesser extent than during the locked-up state for the lean combustion during the run of the vehicle.

12. A fuel supply amount control apparatus according to claim 8, wherein the lean combustion is a stratified charge combustion in which a high-fuel concentration layer is formed by using an amount of fuel whose proportion to an amount of intake air is less than a fuel-to-intake air proportion represented by the stoichiometric air-fuel ratio and the high-fuel concentration layer is ignited.

13. A fuel supply amount control apparatus according to claim 8, wherein the lean combustion is a homogeneous lean combustion in which a mixture is formed by homogeneously mixing an amount of intake air with an amount of fuel whose proportion to the amount of intake air is less than a fuel-to-intake air proportion represented by the stoichiometric air-fuel ratio and the mixture is ignited.

14. A fuel supply amount control apparatus according to claim 8, further comprising a transmission mechanism having a fluidic power transfer mechanism that transfers a drive power between an input shaft and an output shaft via a fluid and that assumes a locked-up state in which the input shaft and the output shaft are interlocked when a running speed of the vehicle becomes higher than a reference speed, wherein when the fluidic power transfer mechanism is in the locked-up state, the controller reduces the idling control amount during the run of the vehicle, and when the fluidic power transfer mechanism is in an unlocked state, the controller does not reduce the idling control amount or reduces the idling control amount to a lesser extent than during the locked-up state during the run of the vehicle.

15. A fuel supply amount control method for a spark ignition type internal combustion engine that is installed in a vehicle and that allows a lean combustion of a mixture in which a proportion of fuel is less than in a mixture having a stoichiometric air-fuel ratio, the fuel supply amount control method comprising:

calculating an idling control amount for keeping a revolution speed of the internal combustion engine at a target idle revolution speed during an idling state of the engine;

adjusting an amount of fuel supplied based on the idling control amount if the lean combustion is conducted during the idling state; and determining the amount of fuel supplied for the lean combustion during a run of the vehicle using a control amount obtained by reducing the idling control amount.

16. A fuel supply amount control method according to claim 15, where the reducing of the idling control amount is performed in accordance with a running speed of the vehicle.

17. A fuel supply amount control method according to claim 15, wherein the reducing of the idling control amount is performed in accordance with the revolution speed of the engine.

18. A fuel supply amount control method according to claim 15, wherein the vehicle has a transmission mechanism having a fluidic power transfer mechanism that transfers a drive power between an input shaft and an output shaft via a fluid and that assumes a locked-up state in which the input shaft and the output shaft are interlocked when necessary, and wherein when the fluidic power transfer mechanism is in the locked-up state, the control amount obtained by reducing the idling control amount is used for the lean combustion during the run of the vehicle, and when the fluidic power transfer mechanism is in an unlocked state, a control amount is determined without reducing the idling control amount or the control amount is determined by reducing the idling control amount to a lesser extent than during the locked-up state for the lean combustion during the run of the vehicle.

19. A fuel supply amount control method according to claim 15, wherein the lean combustion is a stratified charge combustion in which a high-fuel concentration layer is formed by using an amount of fuel whose proportion to an amount of intake air is less than a fuel-to-intake air proportion represented by the stoichiometric air-fuel ratio and the high-fuel concentration layer is ignited.

20. A fuel supply amount control method according to claim 15, wherein the lean combustion is a homogeneous lean combustion in which a mixture is formed by homogeneously mixing an amount of intake air with an amount of fuel whose proportion to the amount of intake air is less than a fuel-to-intake air proportion represented by the stoichiometric air-fuel ratio and the mixture is ignited.

21. A fuel supply amount control method according to claim 15, wherein the vehicle has a transmission mechanism having a fluidic power transfer mechanism that transfers a drive power between an input shaft and an output shaft via a fluid and that assumes a locked-up state in which the input shaft and the output shaft are interlocked when a running speed of the vehicle becomes higher than a reference speed, and wherein when the fluidic power transfer mechanism is in the locked-up state, the control amount obtained by reducing the idling control amount is used during the run of the vehicle, and when the fluidic power transfer mechanism is in an unlocked state, the control amount is determined without reducing the idling control amount or the control amount is determined by reducing the idling control amount to a lesser extent than during the locked-up state during the run of the vehicle.

* * * * *